(12) United States Patent
Danjo et al.

(10) Patent No.: US 11,148,508 B2
(45) Date of Patent: Oct. 19, 2021

(54) COLD-STORAGE HEAT EXCHANGER

(71) Applicant: DENSO CORPORATION, Kariya (JP)

(72) Inventors: Takashi Danjo, Kariya (JP); Atsushi Yamada, Kariya (JP); Takayuki Ota, Kariya (JP); Shin Nishida, Kariya (JP)

(73) Assignee: DENSO CORPORATION, Kariya (JP)

( * ) Notice: Subject to any disclaimer, the term of this patent is extended or adjusted under 35 U.S.C. 154(b) by 217 days.

(21) Appl. No.: 16/237,783

(22) Filed: Jan. 2, 2019

(65) Prior Publication Data

US 2019/0135083 A1    May 9, 2019

Related U.S. Application Data

(63) Continuation of application No. PCT/JP2017/020242, filed on May 31, 2017.

(30) Foreign Application Priority Data

Jul. 8, 2016   (JP) .............................. JP2016-136170

(51) Int. Cl.
*B60H 1/32*     (2006.01)
*F25B 39/02*    (2006.01)
*F28F 9/02*     (2006.01)
*F28D 20/02*    (2006.01)
*F28D 1/053*    (2006.01)

(52) U.S. Cl.
CPC ............. *B60H 1/3202* (2013.01); *B60H 1/32* (2013.01); *F25B 39/02* (2013.01); *F25B 39/028* (2013.01); *F28D 1/05341* (2013.01); *F28D 20/02* (2013.01); *F28F 9/02* (2013.01); *F28F 9/0217* (2013.01); *Y02E 60/14* (2013.01)

(58) Field of Classification Search
CPC .... F25B 39/02; F25B 39/028; F28D 1/05341; F28D 20/02; F28F 9/02; F28F 9/0217
See application file for complete search history.

(56) References Cited

U.S. PATENT DOCUMENTS 9,297,561 B2 *   3/2016   Takagi ................. F28F 17/005
9,719,732 B2 *   8/2017   Ota ..................... F28D 1/05366
10,144,266 B2 * 12/2018   Bellenfant ............ F28D 1/0375
(Continued)

FOREIGN PATENT DOCUMENTS

DE            1813877 U      6/1960
DE       102009040544 A1      5/2010
(Continued)

*Primary Examiner* — Filip Zec
(74) *Attorney, Agent, or Firm* — Harness, Dickey & Pierce, P.L.C.

(57) ABSTRACT

A first header tank and a second header tank of a cold-storage heat exchanger are located away from each other. Refrigerant tubes include refrigerant passages through which the first header tank and the second header tank communicate with each other. The refrigerant tubes are spaced away from each other. Cold energy containers storing cold energy storage members are provided to close air passage portions defined between the refrigerant pipes. A region including the air passage portions are separated into a first region including a center part of the region and a second region that is remaining part of the region. A proportion of the cold energy containers in the second region is larger than that in the first region.

12 Claims, 21 Drawing Sheets

(56) References Cited

U.S. PATENT DOCUMENTS

| | | | |
|---|---|---|---|
| 10,179,498 B2 * | 1/2019 | Wijaya | B60H 1/005 |
| 2002/0088246 A1 | 7/2002 | Bureau et al. | |
| 2002/0088248 A1 | 7/2002 | Bureau et al. | |
| 2004/0093889 A1 | 5/2004 | Bureau et al. | |
| 2004/0104020 A1 | 6/2004 | Haller et al. | |
| 2005/0166632 A1 * | 8/2005 | Bureau | F28D 1/05366 |
| | | | 62/515 |
| 2007/0068650 A1 | 3/2007 | Haller et al. | |
| 2009/0025419 A1 | 1/2009 | Kerler et al. | |
| 2009/0095015 A1 | 4/2009 | Kerler et al. | |
| 2010/0065244 A1 | 3/2010 | Yokoyama et al. | |
| 2012/0042687 A1 * | 2/2012 | Kamoshida | F28D 20/02 |
| | | | 62/524 |
| 2013/0047663 A1 * | 2/2013 | Kamoshida | F25B 39/02 |
| | | | 62/524 |
| 2013/0248166 A1 | 9/2013 | Wang et al. | |

FOREIGN PATENT DOCUMENTS

| | | |
|---|---|---|
| JP | S60091986 U | 6/1985 |
| JP | 2002274165 A | 9/2002 |
| JP | 2004184071 A | 7/2004 |
| JP | 2009526194 A | 7/2009 |
| JP | 2010019475 A | 1/2010 |
| JP | 2010091250 A | 4/2010 |
| JP | 2013049349 A | 3/2013 |

* cited by examiner

COLD-STORAGE HEAT EXCHANGER

CROSS REFERENCE TO RELATED APPLICATION

The present application is a continuation application of International Patent Application No. PCT/JP2017/020242 filed on May 31, 2017, which designated the United States and claims the benefit of priority from Japanese Patent Application No. 2016-136170 filed on Jul. 8, 2016. The entire disclosures of all of the above applications are incorporated herein by reference.

TECHNICAL FIELD

The present disclosure relates to a cold-storage heat exchanger for a vehicular air-conditioning unit.

BACKGROUND

In recent years, idle reduction vehicles have been increasing. The idle reduction vehicles improve fuel economy and reduce exhaust gas by automatically stopping the engine when a vehicle is stopped, e.g. while waiting for traffic light. Regarding the air-conditioning unit installed in this type of vehicle, it has been proposed to install a cold-storage heat exchanger. The cold-storage heat exchanger includes cold energy containers that store the cold energy storage member in some of air passage portions defined between the refrigerant tubes defining the refrigerant passages through which the refrigerant flows. The cold-storage heat exchanger stores, in the cold energy storage member, the cold energy of the refrigerant circulating the refrigeration cycle during engine operation, and the cold-storage heat exchanger performs cooling of a passenger compartment by using the cold energy stored in the cold energy storage member when the circulation of the refrigerant stops during idle reduction.

SUMMARY

According to an aspect of the present disclosure, a cold-storage heat exchanger is provided in an air passage of a vehicular air-conditioning unit and includes a first header tank, second header tank, refrigerant tubes, and cold energy containers. The first header tank defines a passage through which a refrigerant flows. The second header tank defines a passage through which the refrigerant flows and is located away from the first header tank. The cold energy containers store cold energy storage members that freeze due to heat exchange with the refrigerant flowing through the refrigerant passages, and the cold energy containers are provided to close some of air passage portions defined between the refrigerant tubes. A region including the plurality of air passage portions are separated into a first region including a center part of the region and a second region that is remaining part of the region. A proportion of the plurality of cold energy containers in the second region is larger than that in the first region.

EMBODIMENTS

Figure 1:
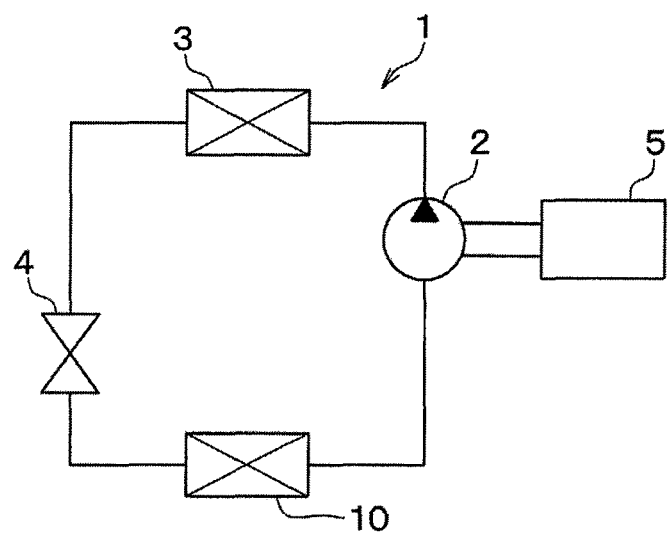
FIG. 1 is a block diagram of a refrigeration cycle device according to a first embodiment.

Embodiments of the present disclosure will be described hereafter with reference to the drawings. In the following embodiments, the same or equivalent parts are denoted by the same reference numerals as each other, and explanations will be provided to the same reference numerals.

First Embodiment

A first embodiment will be described. A cold-storage heat exchanger of the present embodiment is an evaporator used in a refrigeration cycle device constituting a vehicular air-conditioning unit.
<Configuration of Refrigeration Cycle Device 1>
First, configurations of the refrigeration cycle device and the vehicular air-conditioning unit will be described. As shown in FIG. 1, the refrigeration cycle device 1 includes a compressor 2, a condenser 3, an expansion valve 4, and an evaporator 10 that is a cold-storage heat exchanger. These components are annularly connected together with each other through pipes, and thereby a refrigerant circulation passage is constituted.

The compressor 2 draws a refrigerant from an evaporator 10 side, and compresses the refrigerant. The compressor 2 is driven by a driving force transmitted from an engine 5 for vehicle traveling. An electric motor may be used as a power source of the compressor 2.

The high-pressure gas-phase refrigerant discharged from the compressor 2 flows into the condenser 3. The high-pressure gas-phase refrigerant flowing into the condenser 3 is cooled and condensed by heat exchange with an outside air when the refrigerant flows through a refrigerant passage in the condenser 3. The condenser 3 may be referred to as a radiator that dissipates heat of the gas-phase refrigerant to the outside air.

The liquid-phase refrigerant condensed in the condenser 3 is decompressed when the refrigerant flows through the expansion valve 4, and thus the liquid-phase refrigerant changes into a mist-like gas-liquid two-phase refrigerant. The expansion valve 4 may be a fixed throttle such as an orifice and nozzle, or an appropriate variable throttle, for example.

Figure 2:
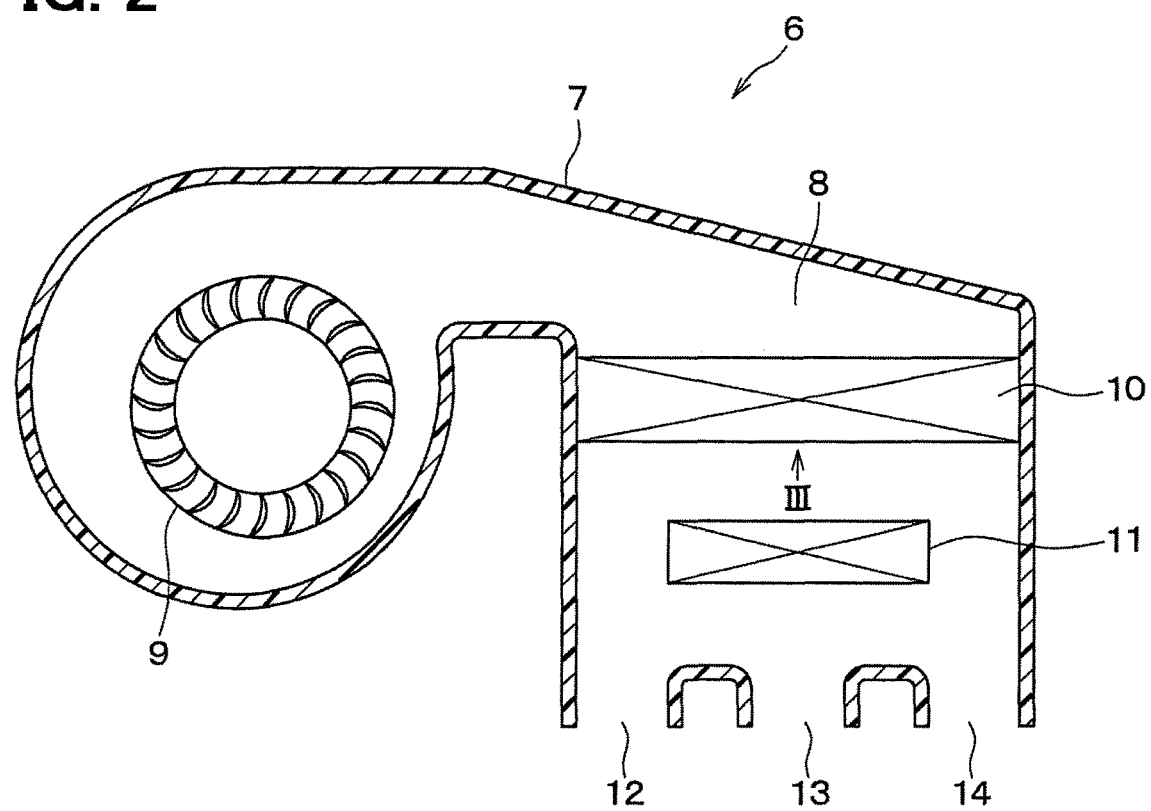
FIG. 2 is a cross-sectional view illustrating an air-conditioning unit for a vehicle according to the first embodiment.

The low-pressure refrigerant that has decompressed flows into the evaporator 10. As shown in FIG. 2, the evaporator 10 is located in an air passage 8 defined in an air-conditioning case 7 of the vehicular air-conditioning unit 6. The air passage 8 of the first embodiment extends from a position facing an upstream surface of the evaporator 10 in a direction intersecting a direction in which a first header tank 51 and a second header tank 52 face each other. A blower 9 is provided in the air passage 8. The blower 9 is a centrifugal fan, for example, and is configured to generate an airflow in the air passage 8. The low-pressure refrigerant flowing through a refrigerant passage in the evaporator 10 absorbs heat from the air blown by the blower 9 and evaporates. As a result, the evaporator 10 cools the air flowing through the air passage 8 by the latent heat of evaporation of the refrigerant. After the temperature of the air is adjusted by a heater core 11, the air is blown into a passenger compartment through a face air outlet 12, a foot air outlet 13, or a defroster air outlet 14. The refrigerant flowing through the evaporator 10 is drawn into the compressor 2 through an accumulator that is not shown.

When the engine that is a power source of the compressor 2 stops, the compressor 2 stops, and the flow of the refrigerant in the refrigeration cycle device 1 stops.

<Configuration of Evaporator 10>

Next, a configuration of the evaporator 10 that is a cold-storage heat exchanger will be described.

Figure 3:
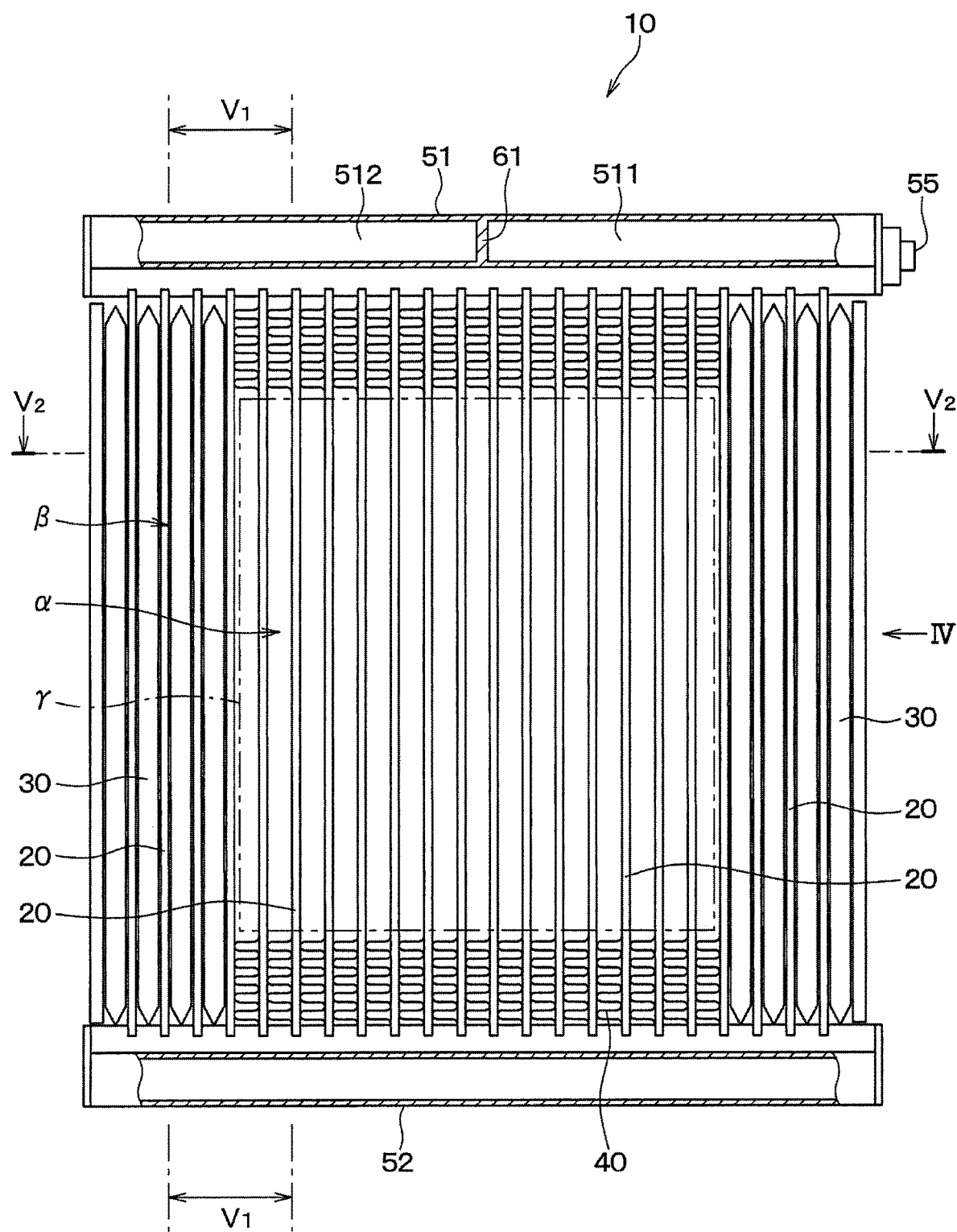
FIG. 3 is a front view illustrating an evaporator according to the first embodiment.
Figure 4:
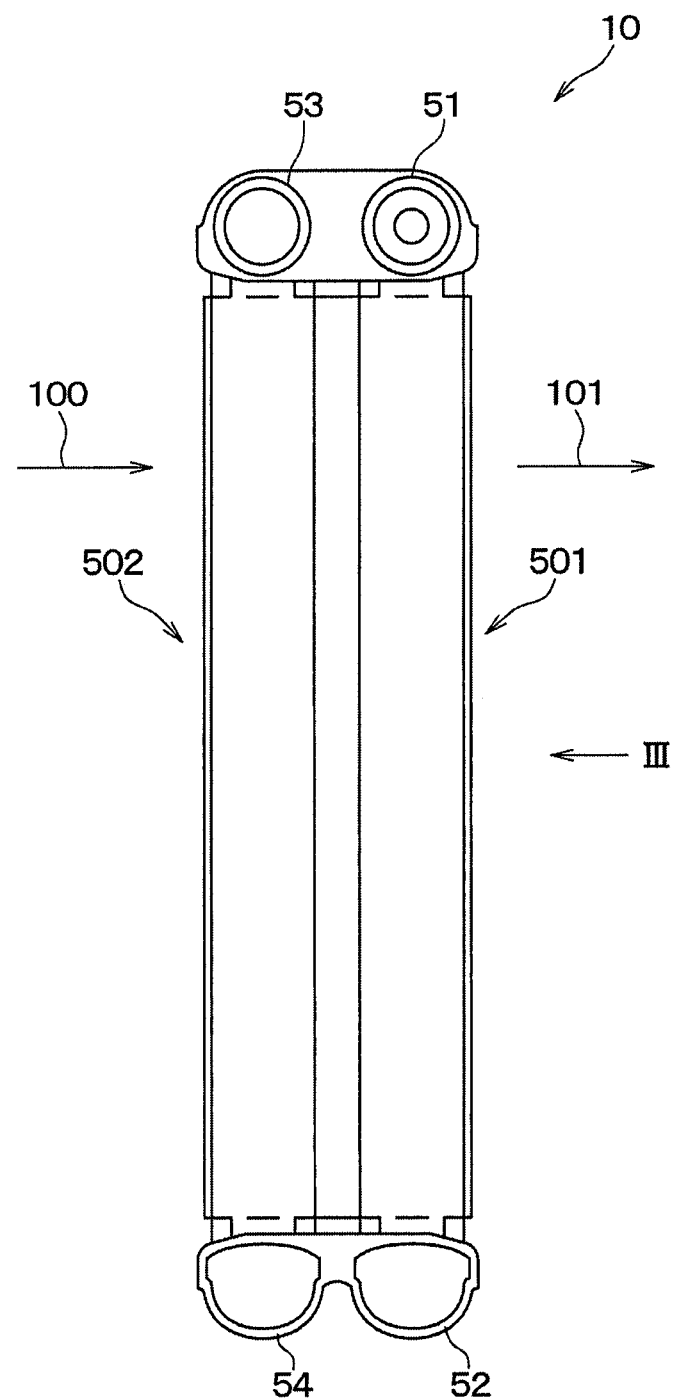
FIG. 4 is a side view viewed along a IV direction of FIG. 3.
Figure 5:
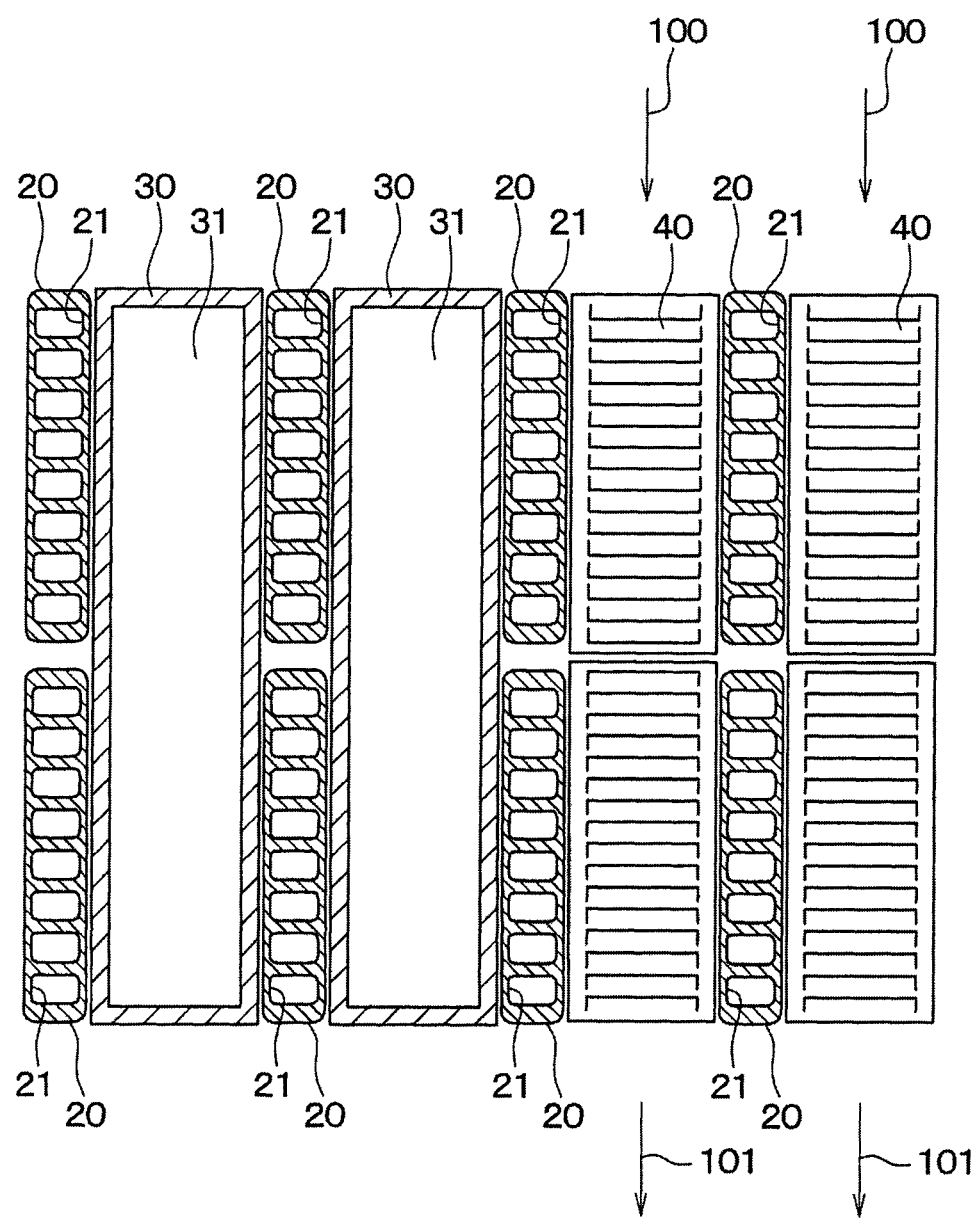
FIG. 5 is a cross-sectional diagram illustrating V1-V1 part taken along V2-V2 line of FIG. 3.

As shown in FIGS. 3 to 5, the evaporator 10 includes multiple refrigerant tubes 20, multiple cold energy containers 30, multiple outer fins 40, and first to fourth header tanks 51, 52, 53, 54. In FIG. 3, a part of the outer fin 40 is omitted.

Arrows 100, 101 shown in FIGS. 4, 5 indicate a direction in which the air flows through an air passage portion of the evaporator 10. In FIG. 3, an air flow direction is directed from a back side of the page to a front side.

As shown in FIGS. 3 and 5, the refrigerant tubes 20 are arranged at predetermined intervals. The refrigerant tubes 20 extend straight from one end to the other end. A refrigerant passage 21 defined inside the refrigerant tube 20 also extends straight from the one end to the other end. The refrigerant tube 20 is made of metal such as aluminum.

In the evaporator 10, gaps are made between the refrigerant tubes 20. Some of the gaps are air passage portions in which the outer fins 40 are provided. In addition, the cold energy containers 30 are provided in other gaps instead of the outer fin 40.

As shown in FIG. 5, the refrigerant tubes 20 are arranged to overlap with each other in the air flow direction. The refrigerant tube 20 is a multi-hole tube whose cross-section has a flat shape, and defines multiple refrigerant passages 21 therein. The refrigerant flows through the refrigerant passages 21.

As shown in FIGS. 3 and 4, the refrigerant passages 21 communicate with passages of the first to fourth header tanks 51, 52, 53, 54 each of which is connected to the one end or the other end of the refrigerant tubes 20. The first to fourth header tanks 51, 52, 53, 54 distribute the refrigerant to the refrigerant tubes 20 or collect the refrigerant flowing out of the refrigerant tubes 20. The first, second header tanks 51, 52 are located on a downstream side in the air flow direction, and the third, fourth header tanks 53, 54 are located on an upstream side in the air flow direction. The first to fourth header tanks 51, 52, 53, 54 are made of metal such as aluminum. In the following description, the downstream side in the air flow direction is simply referred to as the downstream side. Also, the upstream side in the air flow direction is simply referred to as the upstream side.

An example of configurations of the first to fourth header tanks 51, 52, 53, 54 and the refrigerant tubes 20 will be described.

The first header tank 51 and the second header tank 52 are spaced away from each other by a predetermined distance and parallel to each other. In a condition where the evaporator 10 is mounted on the vehicle, the first header tank 51 is above the second header tank 52 in a direction of gravity. The refrigerant tubes 20 are arranged between the first header tank 51 and the second header tank 52. The refrigerant passages 21 of the refrigerant tubes 20 communicate with the passage in the first header tank 51 on the one end, and communicate with the passage in the second header tank 52 on the other end. The first header tank 51, the second header tank 52, and the refrigerant tubes 20 located therebetween constitute a first heat exchanging portion 501.

The passage in the first header tank 51 is partitioned into a first section 511 and a second section 512 by a partition panel 61 provided at a center part in a longitudinal direction of the first header tank 51.

Similarly, the third header tank 53 and the fourth header tank 54 are spaced away from each other by the predetermined distance and parallel to each other. The refrigerant tubes 20 are arranged between the third header tank 53 and the fourth header tank 54. The refrigerant passages 20 are spaced away from each other. The refrigerant passages 21 of the refrigerant tubes 20 communicate with the passage in the third header tank 53 on the one end, and communicate with the passage in the fourth header tank 54 on the other end. The third header tank 53, the fourth header tank 54, and the refrigerant tubes 20 located therebetween constitute a second heat exchanging portion 502.

Although it is not shown in the drawings, the passage in the third header tank 53 is partitioned into a third section and a fourth section by a partition panel provided at a center part in a longitudinal direction of the third header tank 53, similarly to the first header tank 51. The second section 512 of the first header tank 51 and the third section of the third header tank 53 are adjacent to and communicate with each other.

The flow of the refrigerant in the passages in the first to fourth header tanks 51, 52, 53, 54 and the refrigerant passages 21 of the refrigerant tubes 20 are described later.

As shown in FIGS. 3 and 4, the cold energy containers 30 are provided in some of the gaps defined between the refrigerant tubes 20. The cold energy containers 30 are provided to close some of the air passage portions.

The cold energy container 30 has a flat cylindrical shape and stores the cold energy storage member 31 therein. The cold energy container 30 is fixed to the refrigerant tubes 20 provided on both sides of the cold energy container 30 with a bonding material superior in heat transfer such as brazing filler and adhesive. Accordingly, the cold energy container 30 is thermally connected with the refrigerant tubes 20 provided on both sides thereof.

The cold energy storage member 31 contains paraffin or hydrates, for example, and the melting point of the cold energy storage member 31 is adjusted to be between 3 degrees Celsius and 13 degrees Celsius. Accordingly, the cold energy storage member 31 stores the cold energy of the refrigerant by exchanging heat with the refrigerant flowing through the refrigerant tube 20.

A region of the evaporator in which the air passage portions are defined is separated into a first region α including a center part of the region and a second region β that is the remaining parts of the region, as shown in FIG. 3. The first region and the second region have the same area. The second region is the region other than the first region and has the same area of the first region. This also applies to second to thirteenth embodiments to be described later. In FIG. 3, an example of a boundary between the second region β and the first region α is shown with a dot-and-dash line γ. The boundary is appropriately set in light of a shape of the air passage 8 in the vehicular air-conditioning unit 6, a position of the evaporator 10 in the air passage 8, and a distribution of airflow resistance in the air passage 8, for example. That is, shapes of the first region α and the second region β may be a square, a rectangle, a circle, or any other shape. This also applies to second to thirteenth embodiments to be described later. In the following description, the refrigerant passage of the refrigerant tube in the first region may be referred to as the refrigerant passage in the first region. Similarly, the refrigerant passage of the refrigerant tube in the second region may be referred to as the refrigerant passage in the second region.

In the first embodiment, the cold energy containers 30 are provided at least in a part of the second region β and are not provided in the first region α. That is, a proportion of the cold energy containers 30 in the second region β is larger than that in the first region α. In FIG. 3, the cold energy container 30 is not provided in the first region α, but the cold energy container 30 may be provided in the first region α as long as the requirement about the proportion is satisfied.

The proportion of the cold energy container 30 in the first region α means a value of the area occupied by the cold energy container 30 in the first region α divided by the area of the first region α. The proportion of the cold energy container 30 in the second region β means a value of the area occupied by the cold energy container 30 in second region β divided by the area of the second region β.

In the first embodiment, the cold energy containers 30 are provided in both end portions of the second region β in a direction intersecting a direction in which the first header tank 51 and the second header tank 52 face each other. In the description below, the direction intersecting the direction in which the first header tank 51 and the second header tank 52 face each other is referred to as a crosswise direction. The end portions of the second region β in the crosswise direction are close to an inner wall of the air passage 8 when the evaporator 10 is installed in the air passage 8 of the vehicular air-conditioning unit 6.

The cold energy containers 30 may be provided at least in one of the end portions of the second region β in the crosswise direction instead of the both end portions. It is preferable that the position, where the cold energy containers 30 are provided, is close to the inner wall of the air passage 8 when the evaporator 10 is installed in the air passage 8 of the vehicular air-conditioning unit 6, and it is preferable that the wind speed in the position is relatively low.

In the gaps defined between the refrigerant tubes 20, some gaps in which the cold energy container 30 is not provided are the air passage portions through which the air in the air passage 8 of the vehicular air-conditioning unit 6 flows. In the air passage portion, the outer fins 40 are provided.

The outer fins 40 promote the heat exchange between the refrigerant and the cold energy storage member 31, and the heat exchange between the refrigerant and the air passing through the air passage portion. The outer fins 40 are fixed to the refrigerant tubes 20 provided on both sides of the outer fins 40 with a bonding material superior in heat transfer such as brazing filler and adhesive. Accordingly, the outer fins 40 are thermally connected with the refrigerant tubes 20 provided on both sides thereof. The outer fin 40 is a corrugated fin made by bending a thin metal plate such as aluminum plate into a corrugated shape. The outer fin 40 may have louvers.

<Operation of Evaporator 10 and Flow of Refrigerant during Normal Operation of Vehicle>

Next, an operation of the evaporator 10 and a flow of the refrigerant during a normal operation of the vehicle will be described.

In the above-described refrigeration cycle device 1, the compressor 2 is driven by a torque transferred from the engine 5 when an occupant makes a cooling request as an air-conditioning request. According to this, the refrigerant circulates in the refrigeration cycle device 1.

Figure 6:
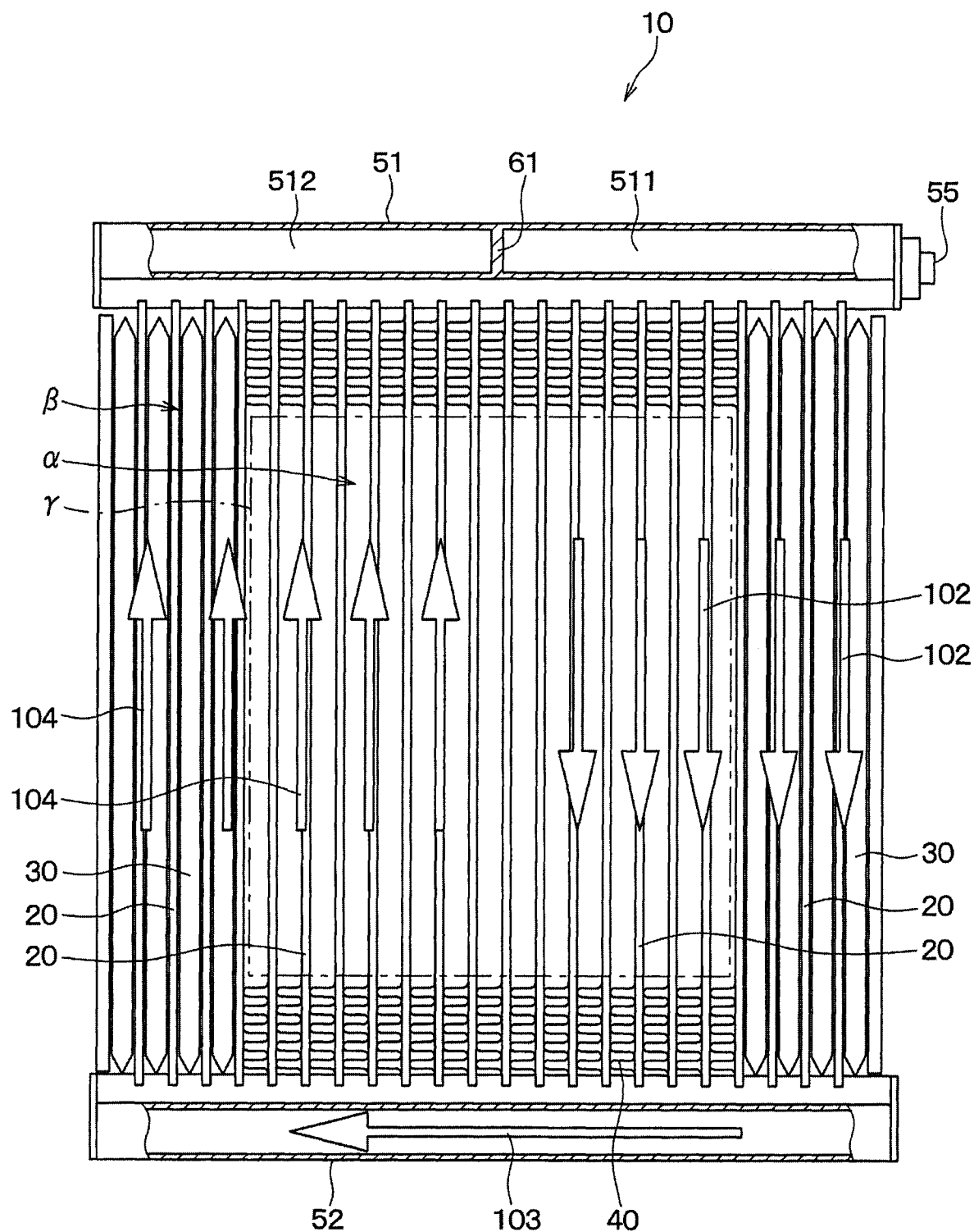
FIG. 6 is a diagram for explaining a flow of a refrigerant during a normal operation of a vehicle.

As shown in FIG. 6, a refrigerant inlet 55 is provided at an end part of the first header tank 51 of the evaporator 10. The refrigerant circulating in the refrigeration cycle device 1 is supplied to the first section 511 of the first header tank 51 from the refrigerant inlet 55 of the first header tank 51. The refrigerant in the first section 511 of the first header tank 51 is distributed to the refrigerant tubes 20 connected to a lower part of the first section 511 as described by an arrow 102, and the refrigerant flows through the refrigerant passages 21 of the refrigerant tubes 20.

The refrigerant that has passed through the refrigerant passages 21 of the refrigerant tubes 20 connected to the lower part of the first section 511 of the first header tank 51 flows into the passage in the second header tank 52. Subsequently, the refrigerant flows through the passage in the second header tank 52, as indicated by an arrow 103. The refrigerant in the passage in the second header tank 52 is distributed to the refrigerant tubes 20 connected to a lower part of the second section 512 of the first header tank 51 as described by an arrow 104, and the refrigerant flows through the refrigerant passages 21 in the refrigerant tubes 20. The refrigerant that has passed through the refrigerant passages 21 of the refrigerant tubes 20 connected to the second section 512 of the first header tank 51 flows into the second section 512 in the first header tank 52. Accordingly, a U-shape flow path is formed in the first heat exchanging portion 501.

Although it is not shown, the refrigerant flowing into the second section 512 of the first header tank 51 flows into the third section of the third header tank 53. The refrigerant flowing into the third section of the third header tank 53 is distributed to the refrigerant tubes 20 connected to a lower part of the third section of the third header tank 53, and the refrigerant flows through the refrigerant passages 21 in the refrigerant tubes 20 into the fourth header tank 54.

The refrigerant that has flown into the fourth header tank 54 is distributed to the refrigerant tubes 20 connected to a lower part of the fourth section of the third header tank 53, and the refrigerant flows through the refrigerant tubes 20 into the fourth section of the third header tank 53. A U-shape flow path is formed in the second heat exchanging portion 502.

A joint (not shown) that is a refrigerant outlet is provided at an end portion of the third header tank 53. The refrigerant in the fourth section of the third header tank 53 flows through the refrigerant outlet toward the compressor 2.

When the refrigerant flows through the first to fourth header tanks 51, 52, 53, 54 and the refrigerant tubes 20, the air flowing through the air passage portion is cooled by latent heat of evaporation of the refrigerant evaporating in the refrigerant passages in the refrigerant tubes 20 through outer walls of the refrigerant tubes 20 and the outer fins 40. The cold energy storage member 31 in the cold energy container 30 is also cooled by the latent heat of vaporization of the refrigerant. When the temperature of the cold energy storage member 31 is lower than the freezing point, the cold energy storage member 31 freezes and stores cold energy.

In the flow of the air flowing through the air passage 8 of the vehicular air-conditioning unit 6, the speed of the air flowing in a center part of the air passage 8 is higher than that of the air flowing in the vicinity of the inner wall of the air passage 8. Since the cold energy container 30 is not provided in the first region α of the air passage portion of the evaporator 10, or the proportion of the cold energy container 30 in the first region α is small, airflow resistance in the first region α can be decreased. According to the evaporator 10, the flow rate of the air in the air passage 8 can be increased, and the cooling capacity during the normal operation of the vehicle can be improved. Further, according to the evaporator 10, since the airflow resistance is low in the first region α of the air passage portion, the energy consumption of the blower 9 of the vehicular air-conditioning unit 6 can be reduced.

<Operation of Evaporator 10 and Flow of Refrigerant during Idle Reduction>

Next, an operation of the evaporator 10 and a flow of the refrigerant during an idle reduction of the vehicle will be described.

When the vehicle stops temporarily, the engine 5 stops due to idle reduction control for suppressing energy consumption, for example. According to this, the compressor 2 stops, and the flow of the refrigerant in the refrigeration cycle device 1 stops. Even in this situation, the blower 9 of the vehicular air-conditioning unit 6 is driven when the occupant makes the cooling request as the air-conditioning request, and the air flows through the air passage portion of the evaporator 10. Accordingly, the temperature of the first to fourth header tanks 51, 52, 53, 54 of the evaporator and the temperature of some refrigerant tubes 20 located away from the cold energy container 30 increases, and the liquid-phase refrigerant in the gas-liquid two-phase refrigerant evaporates. The air flowing through the air passage portion is cooled by the latent heat of vaporization of the refrigerant.

Figure 7:
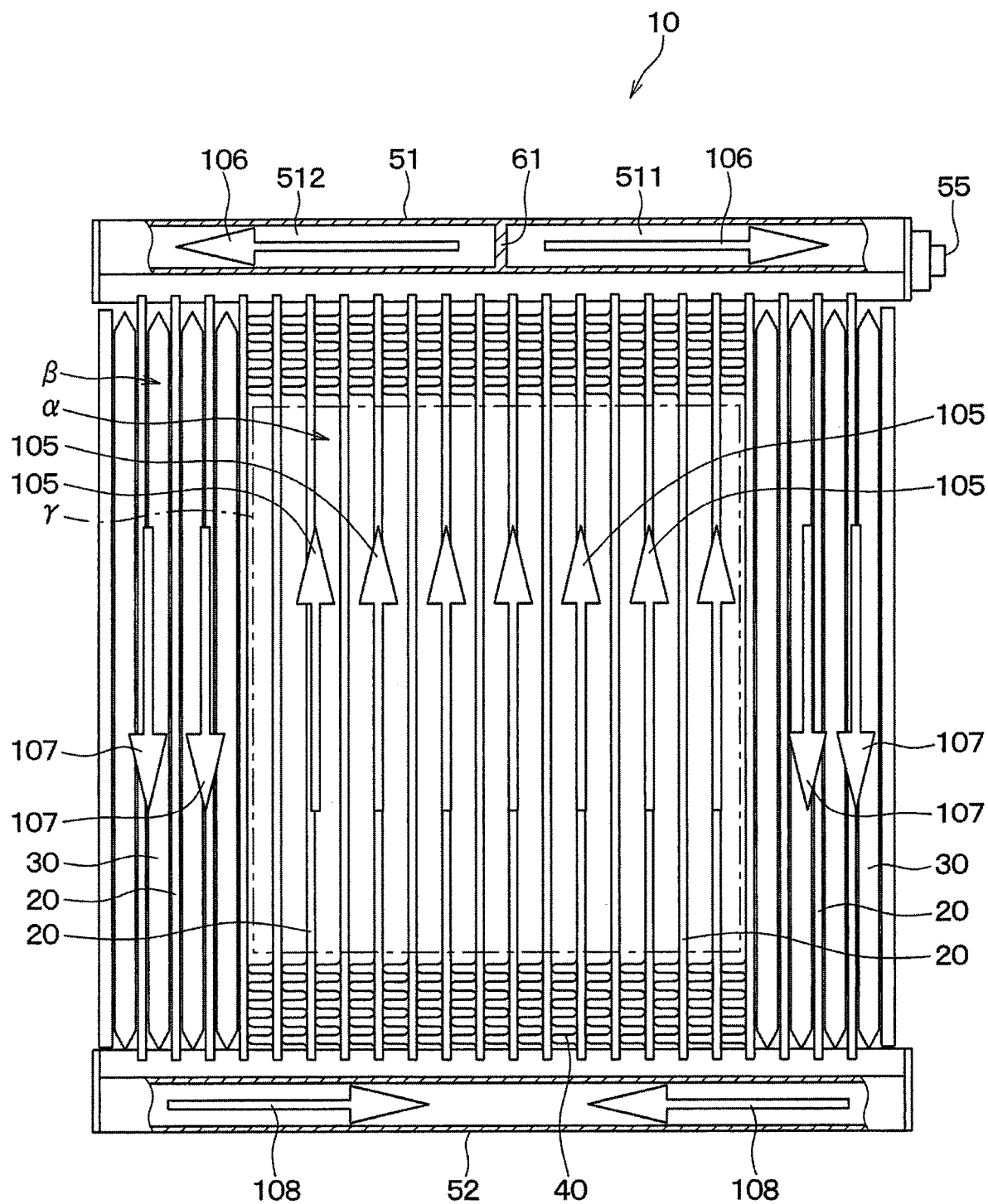
FIG. 7 is a diagram for explaining a flow of the refrigerant during an idle reduction of the vehicle.

In contrast, since some refrigerant tubes 20 close to the cold energy container 30 is cooled by the cold energy of the cold energy storage member 31, the liquid-phase refrigerant in the refrigerant tubes 20 located at that position remains in the liquid-phase condition. Accordingly, the pressure in the refrigerant tubes 20 in the first region α is higher than the pressure in the refrigerant tubes 20 in the both end portions of the second region β. Accordingly, as indicated by arrows 105, 106, 107 in FIG. 7, the gas-phase refrigerant that has evaporated in the refrigerant passages 21 in the refrigerant tubes 20 in the first region α flows through the passages in the first and fourth header tanks 51, 54 into the refrigerant passages 21 of the refrigerant tubes 20 in the both end portions of the second region β. The volume change of the refrigerant in the phase transition from liquid to gas is sufficient for the evaporated refrigerant to get enough speed to flow from the refrigerant passage 21 in the first region α to the refrigerant passages 21 in the second region β located on the both sides of the refrigerant passage 21 in the first region α.

The condensation point of the gas-phase refrigerant moving into the refrigerant passages 21 of the refrigerant tubes 20 in both end portions of the second region β rises along with the increase in pressure. Accordingly, the gas-phase refrigerant is condensed due to the cold energy of the cold energy storage member 31 in the cold energy container 30. As indicated by an arrow 107, the liquid-phase refrigerant that has condensed in the refrigerant passages 21 in the second region β flows into the passages in the second and fourth header tanks 52, 54 located in a lower side in a direction of gravity. The liquid-phase refrigerant flows through the passages in the second and fourth header tanks 52, 54 as indicated by an arrow 108, and the liquid-phase refrigerant evaporates again when the temperature rises up to the boiling point. The gas-phase refrigerant that has evaporated flows through the refrigerant passages 21 of the refrigerant tubes 20 in the first region α as indicated by the arrow 105. The air passing through the air passage portion and the low-temperature gas-phase refrigerant exchange heat, and accordingly the air passing through the air passage portion is cooled. As described above, the refrigerant circulates in the evaporator 10 by using the cold energy in the cold energy storage member 31 while the engine 5 of the vehicle stops as described above, and the air passing through the air passage portion is cooled by the cold energy of the cold energy storage member 31 through the refrigerant. Accordingly, the cooling of the passenger compartment can be performed.

The inventors of the present disclosure have studied a cold-storage heat exchanger according to a comparative example in detail and found the following issues in the cold-storage heat exchanger of the comparative example. In the cold-storage heat exchanger of the comparative example, the cold energy containers are arranged at roughly regular intervals in a region where the air passage portions are defined between the refrigerant tubes. Accordingly, the airflow resistance in the air passage of the vehicular air-conditioning unit may increase due to the cold energy containers when the cooling of the passenger compartment is performed during the normal operation of the vehicle. Therefore, the cooling capacity may decrease during the normal operation of the vehicle when the flow rate of the air in the air passage reduces. Further, the energy consumption by the blower of the vehicular air-conditioning unit may increase due to the increase of the airflow resistance in the air passage of the vehicular air-conditioning unit, and thereby the fuel economy may deteriorate.

In contrast, according to the evaporator 10 in the first embodiment described above, the following effects can be obtained.

(1) In the first embodiment, the proportion of the cold energy containers 30 in the second region β is larger than that in the first region α.

According to the evaporator 10, the airflow resistance in the first region α of the air passage portion can be decreased. Generally, in the flow of the air flowing through the air passage 8 of the vehicular air-conditioning unit 6, the speed of the air flowing in a center part of the air passage 8 is higher than that of the air flowing in the vicinity of the inner wall of the air passage 8. Accordingly, the evaporator 10 suppresses the decrease in the flow rate of the air in the air passage 8 due to the cold energy container 30 and increases the flow rate of the air flowing through the air passage portion of the evaporator 10, and the evaporator 10 improves the cooling capacity in the normal operation of the vehicle.

Further, according to the evaporator 10, since the airflow resistance is low in the first region α, the energy consumption of the blower 9 of the vehicular air-conditioning unit 6 can be reduced.

Further, even when the engine 5 stops due to the idle reduction control of the vehicle, the refrigerant circulates between the refrigerant passages 21 in the first region α and the refrigerant passages 21 in the second region β of the evaporator 10 by using the cold energy in the cold energy storage member 31. Accordingly, the evaporator 10 is capable of cooling the air passing through the air passage portion by the cold energy in the cold energy storage member 31 through the refrigerant, and thereby the cooling of the passenger compartment can be performed even when the engine 5 of the vehicle stops.

(2) In the first embodiment, the proportion of the cold energy containers 30 in at least one of the end portions of the second region β in the crosswise direction is larger than that in the first region α.

According to this, when the one of the end portions of the second region β in the crosswise direction is close to the inner wall of the air passage 8 of the vehicular air-conditioning unit 6, most of the cold energy containers 30 are provided in the position where the air flow speed is relatively low in the air passage 8, and the number of cold energy container 30 provided in the center of the air passage 8 where the air flow speed is high is small. Accordingly, an increase in airflow resistance in the center part of the air passage 8 due to the cold energy containers 30 can be avoided. Accordingly, the cooling capacity during the normal operation of the vehicle can be improved.

Further, according to this configuration, the position of the cold energy container 30 of the first embodiment can be modified without a change in shape of the cold energy container 30 of general evaporator 10.

(3) In the first embodiment, the proportion of the cold energy containers 30 in the both end portions of the second region β in the crosswise direction is larger than that in the first region α.

According to this, when the both end portions of the second region β in the crosswise direction are close to the inner wall of the air passage 8 of the vehicular air-conditioning unit 6, most of the cold energy container 30 are the position close to the inner wall where the air flow speed is relatively low in the air passage 8, and the number of cold energy container 30 provided in the center of the air passage 8 where the air flow speed is high is small. Accordingly, an increase in airflow resistance in the center part of the air passage 8 due to the cold energy containers 30 can be avoided. Accordingly, the cooling capacity during the normal operation of the vehicle can be improved.

(4) In the first embodiment, a part of the passage in the first header tank 51 located above the first region α communicates with a part located above the second region β.

According to this, when the engine 5 stops due to, for example, the idle reduction control of the vehicle, the refrigerant evaporated in the refrigerant passage 21 in the first region α can move from the part above the first region α to the part above the second region β in the first header tank 51. Accordingly, the refrigerant can circulate in the evaporator 10 in the condition where the engine 5 of the vehicle stops.

(5) In the first embodiment, when the evaporator 10 is installed in the vehicular air-conditioning unit 6, a part of the second region β in which the proportion of the cold energy container 30 is large is close to the inner wall of the air passage 8.

According to this, since most of the cold energy containers 30 are provided in the position close to the inner wall of the air passage 8 of the vehicular air-conditioning unit 6 where the airflow resistance is small, and the number of the cold energy container 20 provided in the center of the air passage 8 is small, the increase in airflow resistance in the center part of the air passage 8 due to the cold energy container 30 can be limited. Accordingly, the cooling capacity during the normal operation of the vehicle can be improved.

Second Embodiment

A second embodiment will be described hereafter. The evaporator 10 of the second embodiment is substantially the same as the first embodiment except that the configurations of the first to fourth header tanks 51, 52, 53, 54 are changed with respect to that of the first embodiment, and thus only differences from the first embodiment will be described.

Figure 8:
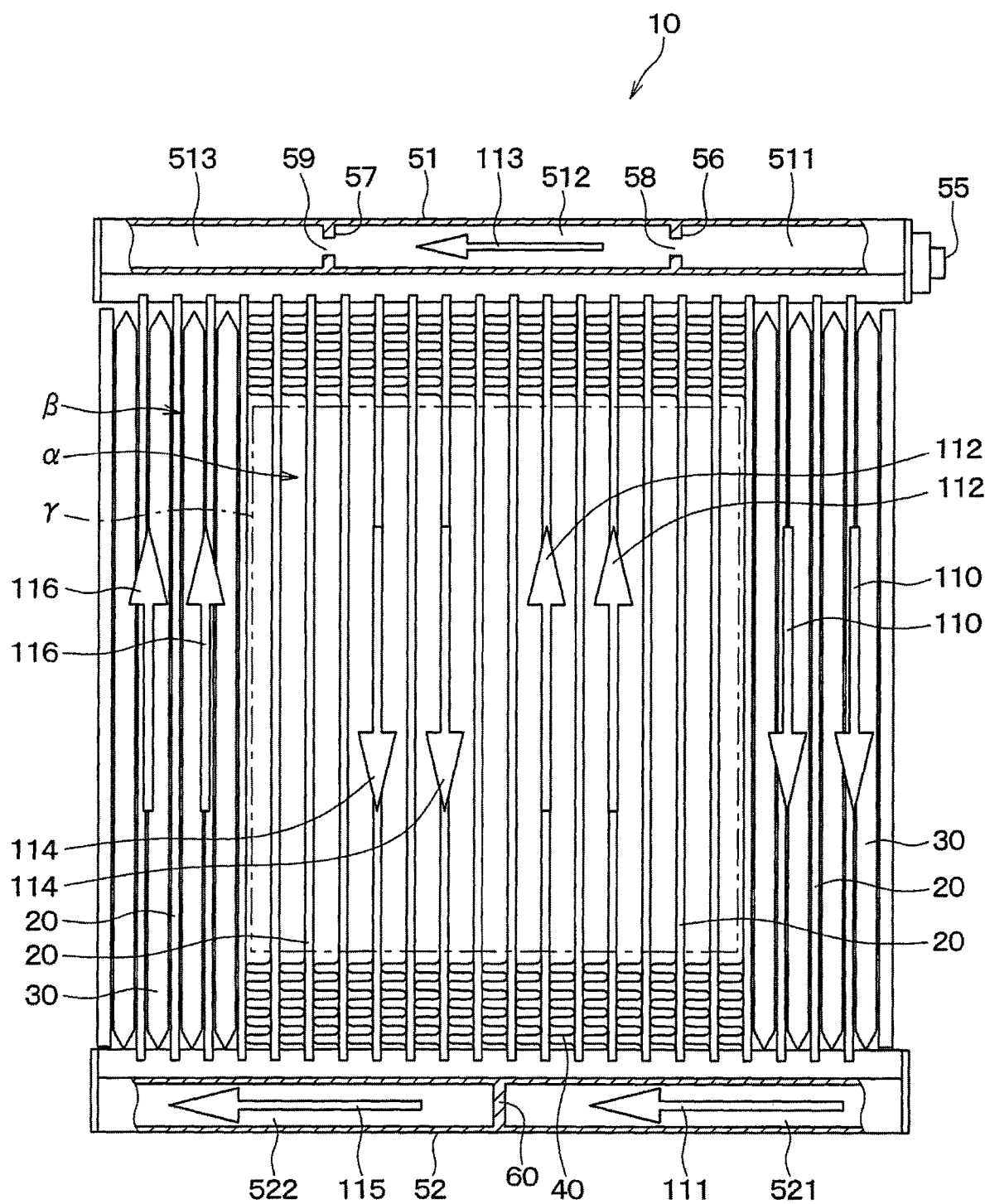
FIG. 8 is a diagram for explaining a flow of a refrigerant in an evaporator during a normal operation of a vehicle, according to a second embodiment.

As shown in FIG. 8, in the second section, the passage in the first header tank 51 is sectioned by two partition panels 56, 57 into the first section 511, the second section 512, and a third section 513, from the refrigerant inlet 55. The two partition panels 56, 57 provided in the passage in the first header tank 51 include a through-hole 58, 59 extending in its thickness direction. That is, the partition panels 56, 57 partially limit the flow of the refrigerant between the first section 511, the second section 512, and the third section 513, and do not shut off the flow of the refrigerant between those.

In contrast, the passage in the second header tank 52 is partitioned by one partition panel 60 into a fourth section 521 and a fifth section 522.

Although it is not shown in the drawings, the passage in the third header tank 53 is partitioned into a sixth section, a seventh section, and a eighth section by two partition panels, similarly to the first header tank 51. The two partition panels provided in the third header tank 53 also include through-holes extending in its thickness direction.

Further, the passage in the fourth header tank 54 is partitioned by one partition panel into a ninth section and a tenth section, similarly to the second header tank 52.

The third section 513 of the first header tank 51 and the sixth section of the third header tank 53 are adjacent to and communicate with each other.

<Operation of Evaporator 10 and Flow of Refrigerant during Normal Operation of Vehicle>

Next, an operation of the evaporator 10 and a flow of the refrigerant during a normal operation of the vehicle will be described.

As shown in FIG. 8, in the normal operation of the vehicle, the refrigerant circulating in the refrigeration cycle device 1 is supplied to the first section 511 from the refrigerant inlet 55 of the first header tank 51. The refrigerant in the first section 511 of the first header tank 51 is distributed to the refrigerant tubes 20 located below the first section 511 as indicated by an arrow 110.

The refrigerant flowing through the refrigerant tubes 20 flows into the fourth section 521 of the second header tank 52. Subsequently, the refrigerant flows through the fourth section 521 in the second header tank 52, as indicated by an arrow 111. The refrigerant in the fourth section 521 of the second header tank 52 flows into the refrigerant tubes 20 located above the fourth section 521 and below the second section 512 of the first header tank 51, as indicated by an arrow 112. Subsequently, the refrigerant flowing through the refrigerant tubes 20 flows into the second section 512 of the first header tank 51.

Subsequently, the refrigerant flows through the second section 512 of the first header tank 51, as indicated by an arrow 113. The refrigerant in the second section 512 of the first header tank 51 flows into the refrigerant tubes 20 located below the second section 512 and above the fifth section 522 of the second header tank 52, as indicated by an arrow 114. Subsequently, the refrigerant flowing through the refrigerant tubes 20 flows into the fifth section 522 of the second header tank 52.

Subsequently, the refrigerant flows through the fifth section 522 of the second header tank 52, as indicated by an arrow 115. The refrigerant in the fifth section 522 of the second header tank 52 is distributed to the refrigerant tubes 20 located below the third section 513 of the first header tank 51, as indicated by an arrow 116. Subsequently, the refrigerant flowing through the refrigerant tube 20 flows into the third section 513 of the first header tank 51.

Accordingly, a W-shape flow path is formed in the first heat exchanging portion 501.

The refrigerant flowing into the third section 513 of the first header tank 51 flows into the sixth section of the third header tank 53. Although it is not shown in the drawings, the flow path in the second heat exchanging portion 502 also has a W-shape as in the first heat exchanging portion 501. The refrigerant flowing through the second heat exchanging portion 502 in the W-shape flows out from the refrigerant outlet provided in the end part of the third header tank 53 toward the compressor 2.

When the refrigerant flows through the first to fourth header tanks 51, 52, 53, 54 and the refrigerant tubes 20, the air flowing through the air passage portion is cooled by latent heat of evaporation of the refrigerant evaporating in the refrigerant passages in the refrigerant tubes 20 through outer walls of the refrigerant tubes 20 and the outer fins 40. The cold energy storage member 31 in the cold energy container 30 is also cooled by the latent heat of vaporization of the refrigerant. When the temperature of the cold energy storage member 31 is lower than the freezing point, the cold energy storage member 31 freezes and stores cold energy.

<Operation of Evaporator 10 and Flow of Refrigerant during Idle Reduction>

Next, an operation of the evaporator 10 and a flow of the refrigerant during an idle reduction of the vehicle will be described.

When the vehicle stops temporarily, the engine 5 stops due to idle reduction control for suppressing energy consumption, for example. According to this, the compressor 2 stops, and the flow of the refrigerant in the refrigeration cycle device 1 stops. Even in this situation, the blower 9 of the vehicular air-conditioning unit 6 is driven when the occupant makes the cooling request as the air-conditioning request, and the air flows through the air passage portion of the evaporator 10. Accordingly, the temperature of the first to fourth header tanks 51, 52, 53, 54 of the evaporator and the temperature of some refrigerant tubes 20 located away from the cold energy container 30 increases, and the liquid-phase refrigerant in the gas-liquid two-phase refrigerant evaporates. The air flowing through the air passage portion is cooled by the latent heat of vaporization of the refrigerant.

Figure 9:
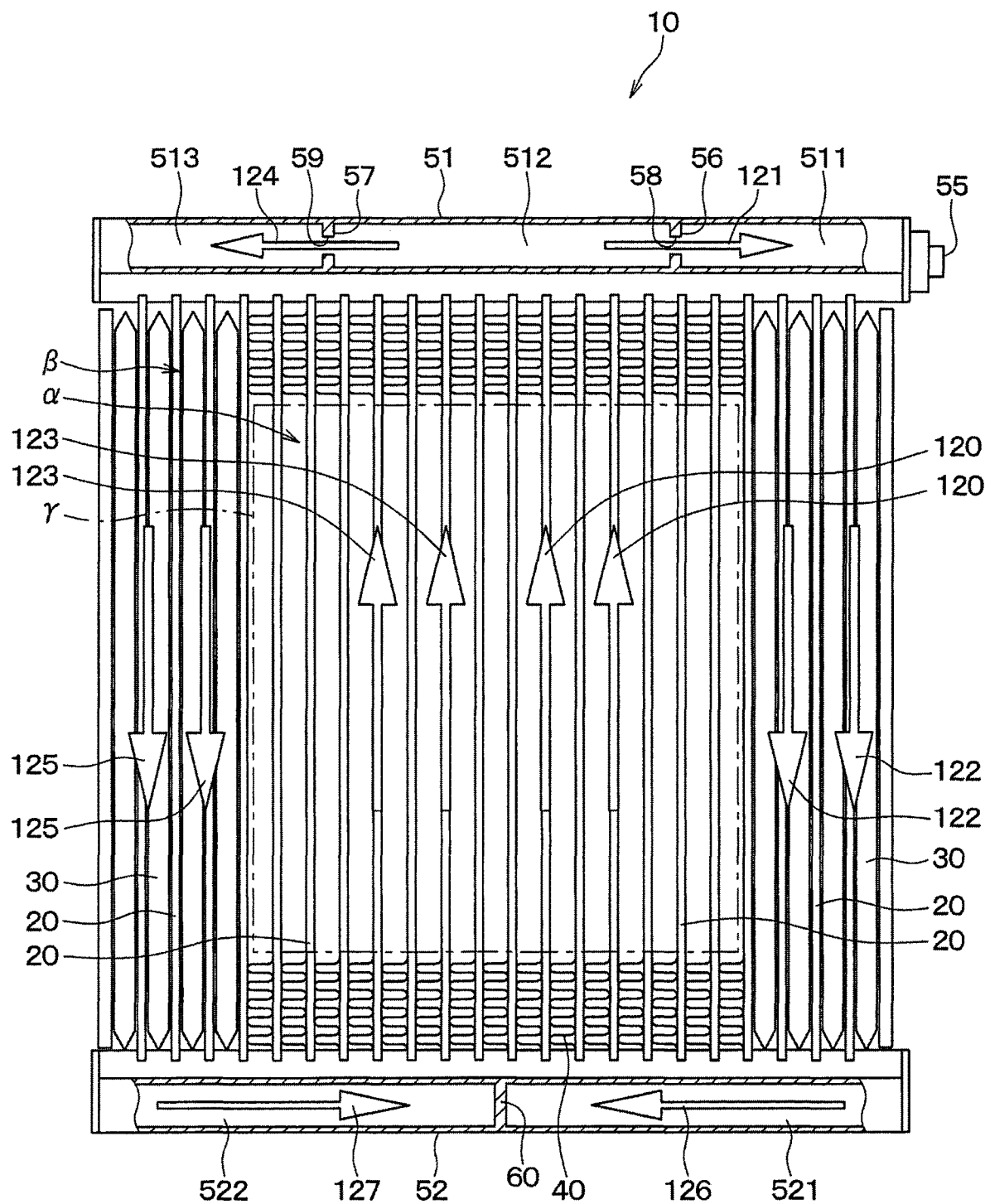
FIG. 9 is a diagram for explaining a flow of a refrigerant in an evaporator during an idle reduction of the vehicle, according to the second embodiment.

In contrast, since some refrigerant tubes 20 close to the cold energy container 30 is cooled by the cold energy of the cold energy storage member 31, the liquid-phase refrigerant in the refrigerant tubes 20 located at that position remains in the liquid-phase condition. Accordingly, the pressure in the refrigerant passage 21 in the first region $\alpha$ is higher than the pressure in the refrigerant passage 21 in the both end portions of the second region $\beta$. Accordingly, as indicated by arrows 123, 124, 125 in FIG. 9, the gas-phase refrigerant that has evaporated in the refrigerant passages 21 in the first region $\alpha$ flows through the passages in the first and fourth header tanks 51, 54 into the refrigerant passages 21 in the second region $\beta$. The refrigerant flowing through the passage in the first header tank 51 flows through the through-hole 58 of the partition panel 56, and thus the refrigerant flows from the second section 512 to the first section 511. Further, the refrigerant flowing through the passage in the first header tank 51 flows through the through-hole 59 of the partition panel 57, and thus the refrigerant flows from the second section 512 to the third section 513.

The condensation point of the gas-phase refrigerant moving into the refrigerant passages 21 of the refrigerant tubes 20 in both end portions of the second region $\beta$ rises along with the increase in pressure. Accordingly, the gas-phase refrigerant is condensed due to the cold energy of the cold energy storage member 31 in the cold energy container 30. As indicated by arrows 126, 127, the liquid-phase refrigerant that has condensed in the refrigerant passages 21 in the second region $\beta$ flows into the fourth section 521 and the fifth section 522 which are the passages in the second header tank 52 located in a lower side in a direction of gravity. The liquid-phase refrigerant flows through the fourth section 521 and the fifth section 522 which are the passages in the second header tank 52, and the liquid-phase refrigerant evaporates again when the temperature rises up to the boiling point. The gas-phase refrigerant that has evaporated flows through the refrigerant passages 21 in the refrigerant tubes 20 in the first region $\alpha$ as indicated by the arrow 120, 123. The air passing through the air passage portion and the low-temperature gas-phase refrigerant exchange heat, and accordingly the air passing through the air passage portion is cooled. As described above, the refrigerant circulates in the evaporator 10 by using the cold energy in the cold energy storage member 31 while the engine 5 of the vehicle stops as described above, and the air passing through the air passage portion is cooled by the cold energy of the cold energy storage member 31 through the refrigerant. Accordingly, the cooling of the passenger compartment can be performed.

The refrigerant in the second heat exchanging portion 502 circulates in the same way as the refrigerant in the first heat exchanging portion 501.

In the above-described second embodiment, the partition panels 56, 57 limiting the flow of the refrigerant are provided in the passage in the first and third header tanks 51, 53. The partition panels 56, 57 include through-holes 58, 59 extending in the thickness direction.

According to this, the refrigerant can flow from a part located above the first region α to a part located above the second region β in the passage in the first header tank 51. Further, the refrigerant can flow from a part located above the first region α to a part located above the second region β in the passage in the third header tank 53. Accordingly, the refrigerant can circulate in the evaporator 10 in the condition where the engine 5 of the vehicle stops.

Third Embodiment

Figure 10:
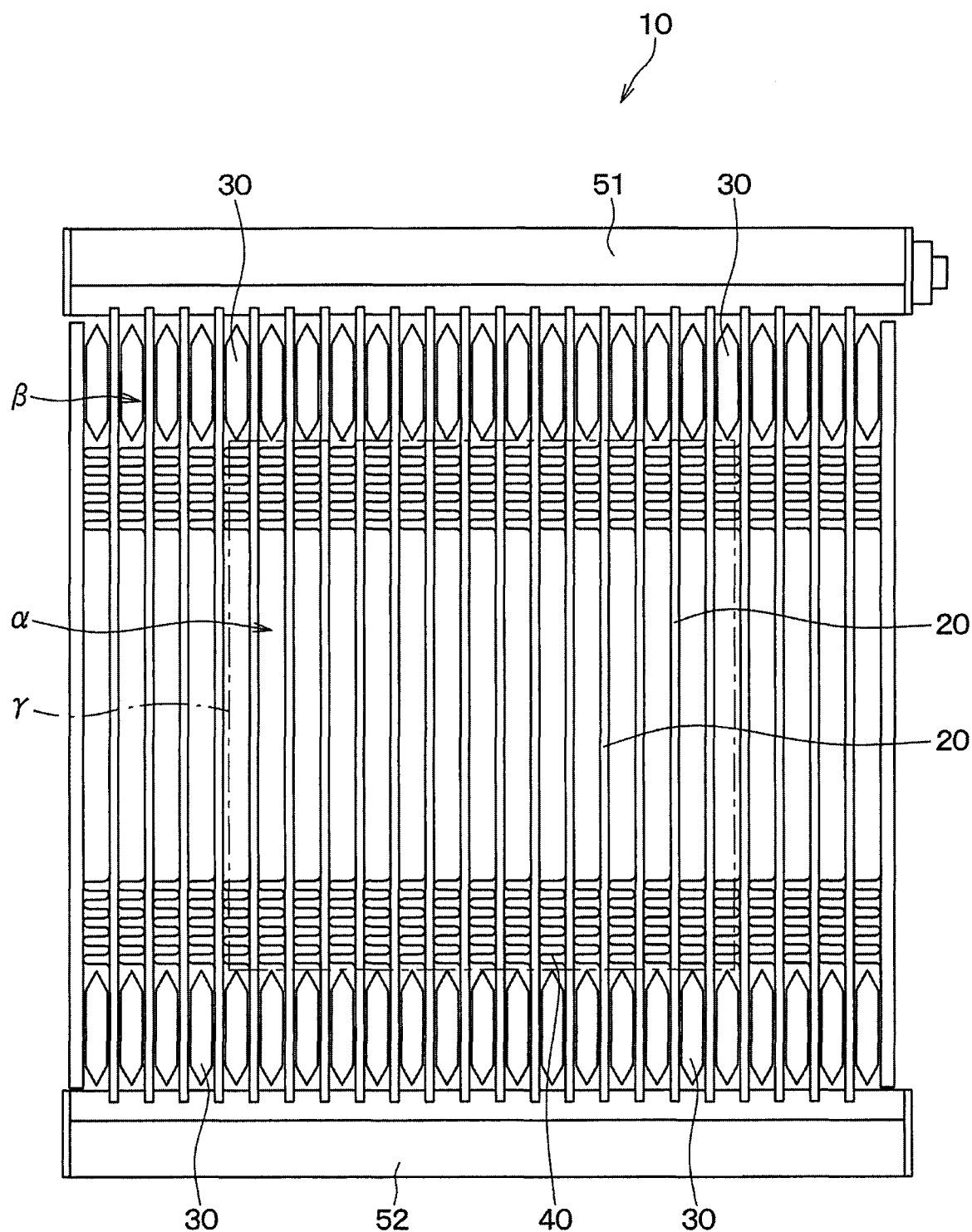
FIG. 10 is a front view illustrating an evaporator according to a third embodiment.

A third embodiment will be described hereafter. As illustrated in FIG. 10, the evaporator 10 of the third embodiment is different from the first embodiment in configurations of the cold energy containers 30 and the outer fins 40.

In FIG. 10, the part in which the air passage portions are defined is separated into the second region β and the first region α, and an example of the boundary between the second region β and the first region α is shown with a dot-and-dash line γ. The boundary is appropriately set in light of a shape of the air passage 8 in the vehicular air-conditioning unit 6, a position of the evaporator 10 in the air passage 8, and a distribution of airflow resistance in the air passage 8, for example.

In the third embodiment, the cold energy containers 30 are provided in both end portions of the second region β in a direction in which the first header tank 51 and the second header tank 52 face each other. In the description below, the direction in which the first header tank 51 and the second header tank 52 face each other is referred to as a lengthwise direction. That is, in the third embodiment, the proportion of the cold energy containers 30 in the both end portions of the second region β in the lengthwise direction is larger than that in the first region α. The end portions of the second region β in the lengthwise direction are close to an inner wall of the air passage 8 when the evaporator 10 is provided in the air passage 8 of the vehicular air-conditioning unit 6.

The cold energy containers 30 may be provided at least in one of the end portions of the second region β in the lengthwise direction instead of the both end portions.

In the gaps defined between the refrigerant tubes 20, some gaps in which the cold energy container 30 is not provided are the air passage portions through which the air in the air passage 8 of the vehicular air-conditioning unit 6 flows. In the air passage portion, the outer fins 40 are provided. In FIG. 10, a part of the outer fin 40 is omitted.

In the above-described third embodiment, the proportion of the cold energy containers 30 in at least one of the end portions of the second region β in the lengthwise direction is larger than that in the first region α.

According to this, when the one of the end portions of the second region β of the evaporator 10 in the lengthwise direction is close to the inner wall of the air passage 8 of the vehicular air-conditioning unit 6, most of the cold energy containers 30 are provided in the position where the air flow speed is relatively low in the air passage 8, and the number of the cold energy container 30 provided in the center of the air passage 8 where the air flow speed is high is small. Accordingly, an increase in airflow resistance in the center part of the air passage 8 due to the cold energy containers 30 can be avoided. Accordingly, the cooling capacity during the normal operation of the vehicle can be improved.

When the engine 5 stops due to, for example, the idle reduction control of the vehicle, the liquid-phase refrigerant in the refrigerant passages 21 located in the center part of the cold-storage heat exchanger in the lengthwise direction evaporates, and thus the air passing through the air passage portions is cooled. The gas-phase refrigerant flows to the refrigerant passage 21 adjacent to the first to fourth header tanks 51, 52, 53, 54, and the refrigerant is cooled and condensed through heat exchange with the cold energy storage member 31 in the cold energy container 30. The condensed liquid-phase refrigerant moves downward in the direction of gravity. The refrigerant evaporates again when the temperature rises up to the boiling point, and the refrigerant cools the air passing through the air passage portion. As described above, the refrigerant circulates in the evaporator 10 of the third embodiment by using the cold energy in the cold energy storage member 31 while the engine 5 of the vehicle stops, and the air passing through the air passage portion is cooled by the cold energy of the cold energy storage member 31 through the refrigerant. Accordingly, the cooling of the passenger compartment can be performed.

Fourth Embodiment

Figure 11:
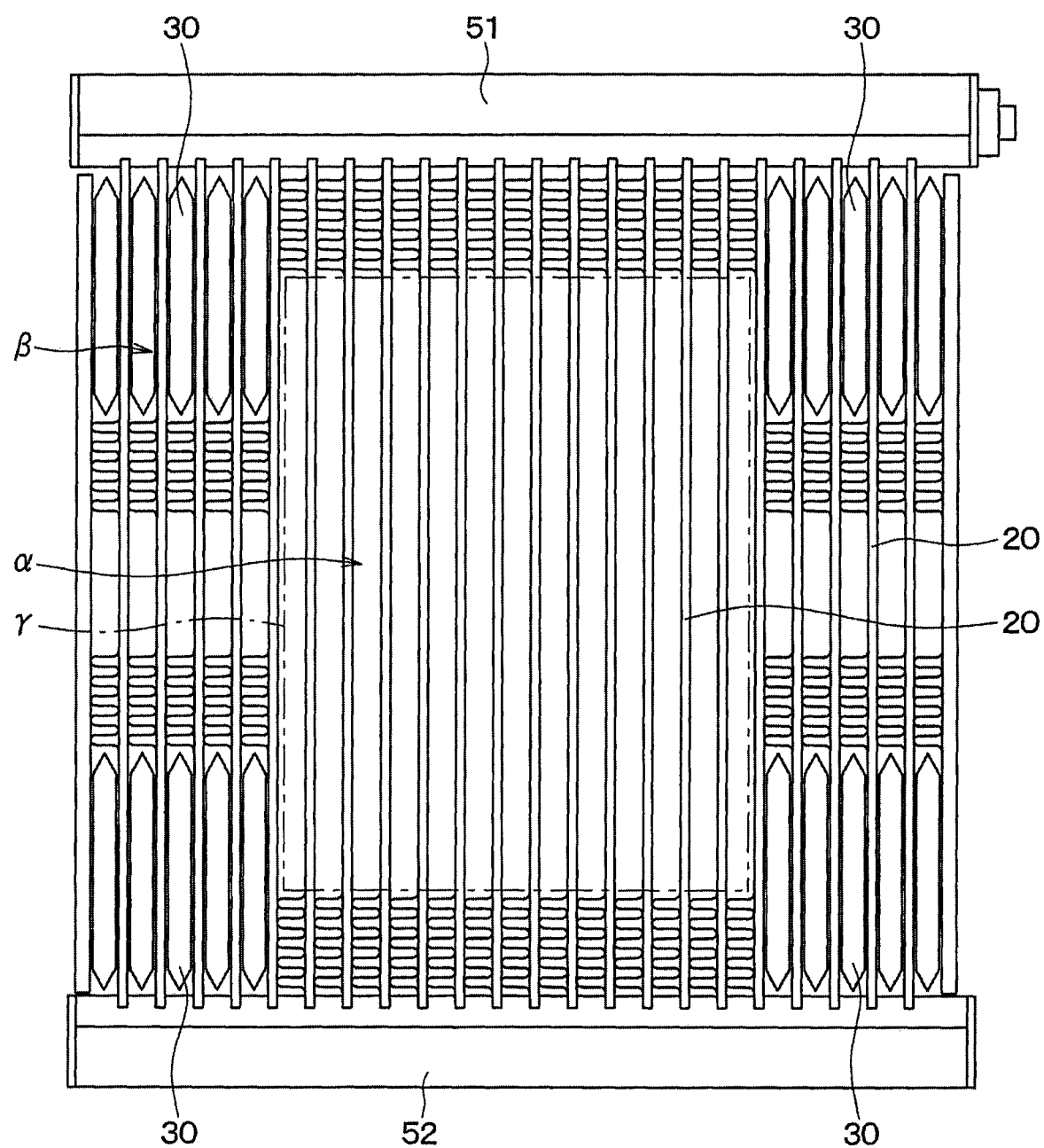
FIG. 11 is a front view illustrating an evaporator according to a fourth embodiment.

A fourth embodiment will be described hereafter. As illustrated in FIG. 11, the evaporator 10 of the fourth embodiment is different from the first and third embodiments in configurations of the cold energy containers 30 and the outer fins 40.

In FIG. 11, the part in which the air passage portions are defined is separated into the second region β and the first region α, and an example of the boundary between the second region β and the first region α is shown with a dot-and-dash line γ. The boundary is appropriately set in light of a shape of the air passage 8 in the vehicular air-conditioning unit 6, a position of the evaporator 10 in the air passage 8, and a distribution of airflow resistance in the air passage 8, for example.

In the fourth embodiment, the cold energy containers 30 are provided in four corner portions of the second region β. That is, in the fourth embodiment, the proportion of the cold energy containers 30 in the four corner portions of the second region β is larger than that in the first region α. The four corner portions of the second region β are close to four corners of an inner wall of the air passage 8 when the evaporator 10 is provided in the air passage 8 of the vehicular air-conditioning unit 6.

The cold energy containers 30 may be provided at least in one of the four corner portions of the second region β instead of all of the four corner portions.

In the gaps defined between the refrigerant tubes 20, some gaps in which the cold energy container 30 is not provided are the air passage portions through which the air in the air passage 8 of the vehicular air-conditioning unit 6 flows. In the air passage portion, the outer fins 40 are provided. In FIG. 11, a part of the outer fin 40 is omitted.

The above-described fourth embodiment is effective when the four corner portions of the second region β of the evaporator 10 are located in the vicinity of the four corners of the inner wall of the air passage 8 of the vehicular air-conditioning unit 6. That is, according to the evaporator 10, most of the cold energy containers 30 are provided in the position close to the inner wall where the air flow speed is relatively low in the air passage 8 of the vehicular air-conditioning unit 6, and the number of the cold energy container 30 provided in the center of the air passage 8 where the air flow speed is high is small. Accordingly, an increase in airflow resistance in the center part of the air passage 8 due to the cold energy containers 30 can be avoided. Accordingly, the cooling capacity during the normal operation of the vehicle can be improved.

Further, the refrigerant circulates in the evaporator 10 of the fourth embodiment by using the cold energy in the cold energy storage member 31 while the engine 5 of the vehicle stops as in the first and second embodiments, and the air passing through the air passage portion is cooled by the cold energy of the cold energy storage member 31 through the refrigerant. Accordingly, the cooling of the passenger compartment can be performed.

Fifth Embodiment

Figure 12:
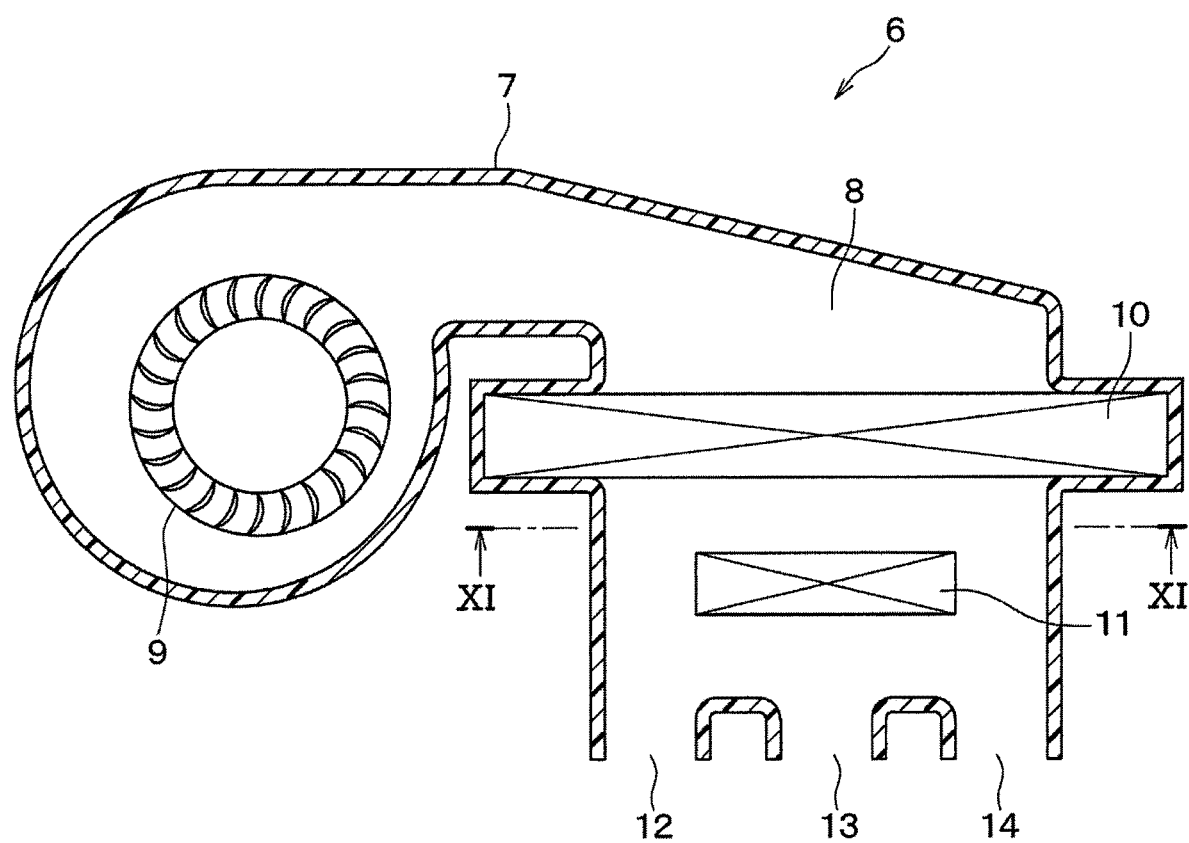
FIG. 12 is a front view illustrating an evaporator according to a fifth embodiment.

A fifth embodiment will be described hereafter. As described in FIGS. 12, 13, a size of the evaporator 10 of the fifth embodiment is larger than the air passage 8 of the vehicular air-conditioning unit 6. That is, the evaporator 10 extends from the air passage 8 defined inside the air-conditioning case 7 of the vehicular air-conditioning unit 6 to an outside of the air passage 8.

In the part of the evaporator 10 in which the air passage portions are defined, the first region α is inside the air passage 8 of the vehicular air-conditioning unit 6, and the second region β is outside the air passage 8. That is, the part of the evaporator 10 located inside the air passage 8 of the vehicular air-conditioning unit 6 is the first region α, and the part of the evaporator 10 located outside the air passage 8 is the second region β.

Since the second region β of the evaporator 10 is outside the air passage 8 of the vehicular air-conditioning unit 6, the cold energy containers 30 of the evaporator 10 is also located outside the air passage 8 of the vehicular air-conditioning unit 6. The cold energy containers 30 are provided in the second region β and are not provided in the first region α. That is, a proportion of the cold energy containers 30 in the second region β is larger than that in the first region α.

Figure 13:
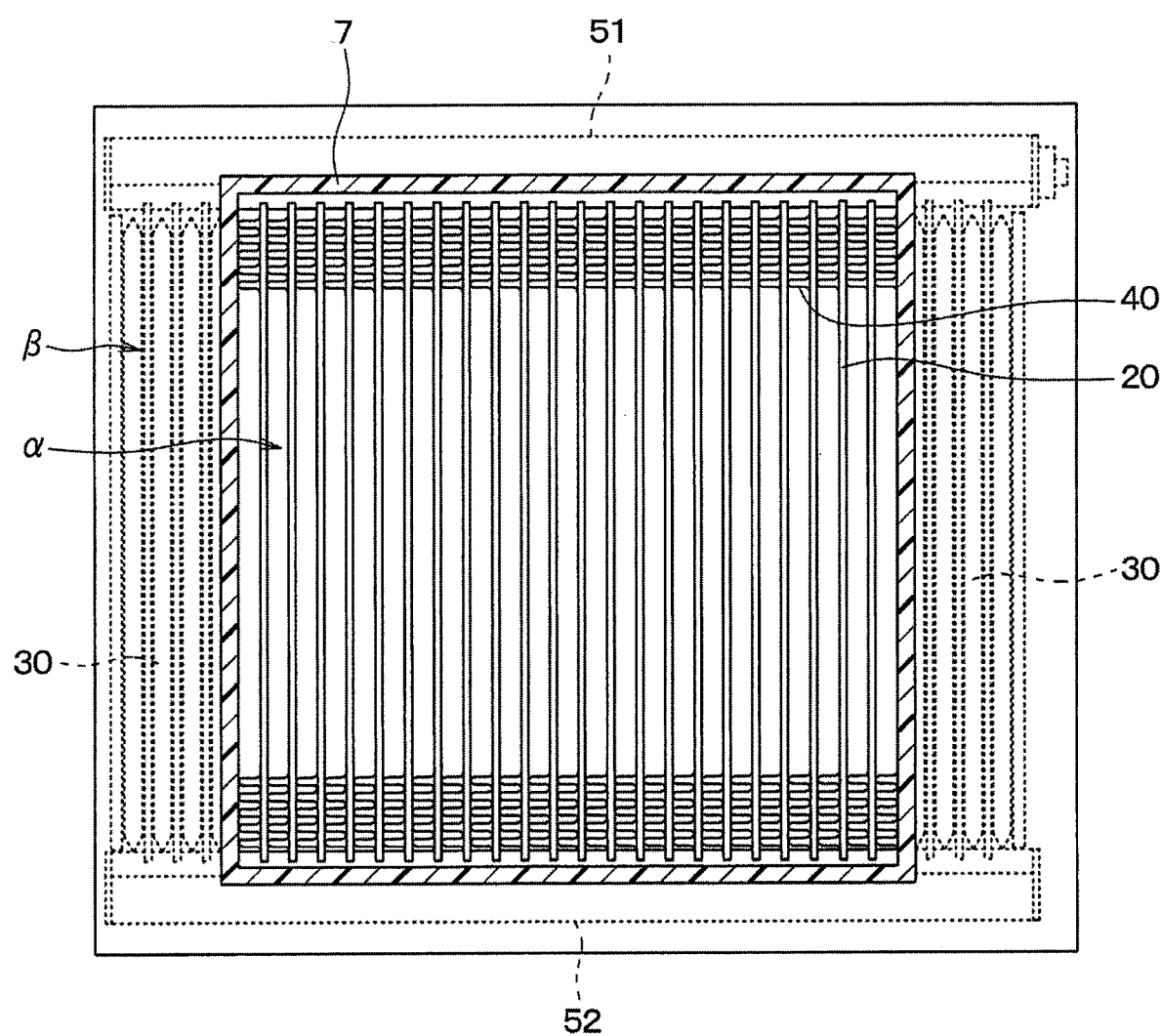
FIG. 13 is a cross-sectional view taken along line XIII-XIII of FIG. 12.

In FIG. 13, the cold energy container 30 is not provided in the first region α, but the cold energy container 30 may be provided in the first region α as long as the requirement about the proportion is satisfied.

In the gaps defined between the refrigerant tubes 20, some gaps in which the cold energy container 30 is not provided are the air passage portions through which the air in the air passage 8 of the vehicular air-conditioning unit 6 flows. In the air passage portion, the outer fins 40 are provided. In FIG. 13, a part of the outer fin 40 is omitted.

In the above-described fifth embodiment, the evaporator 10 extends from the air passage 8 defined inside the air-conditioning case 7 of the vehicular air-conditioning unit 6 to an outside of the air passage 8. When the evaporator 10 is mounted on the vehicular air-conditioning unit 6, a part of the second region β in which the proportion of the cold energy container 30 is large is located outside the air passage 8, and the first region α is located inside the air passage 8.

According to this, since most of the cold energy containers 30 are provided outside the air passage 8 of the vehicular air-conditioning unit 6, the increase in airflow resistance in the center part of the air passage 8 due to the cold energy container 30 can be limited. Accordingly, the cooling capacity during the normal operation of the vehicle can be improved.

Further, the refrigerant circulates in the evaporator 10 of the fifth embodiment by using the cold energy in the cold energy storage member 31 while the engine 5 of the vehicle stops as in the first and second embodiments, and the air passing through the air passage portion is cooled by the cold energy of the cold energy storage member 31 through the refrigerant. Accordingly, the cooling of the passenger compartment can be performed.

Sixth Embodiment

A sixth embodiment will be described hereafter.

Figure 14:
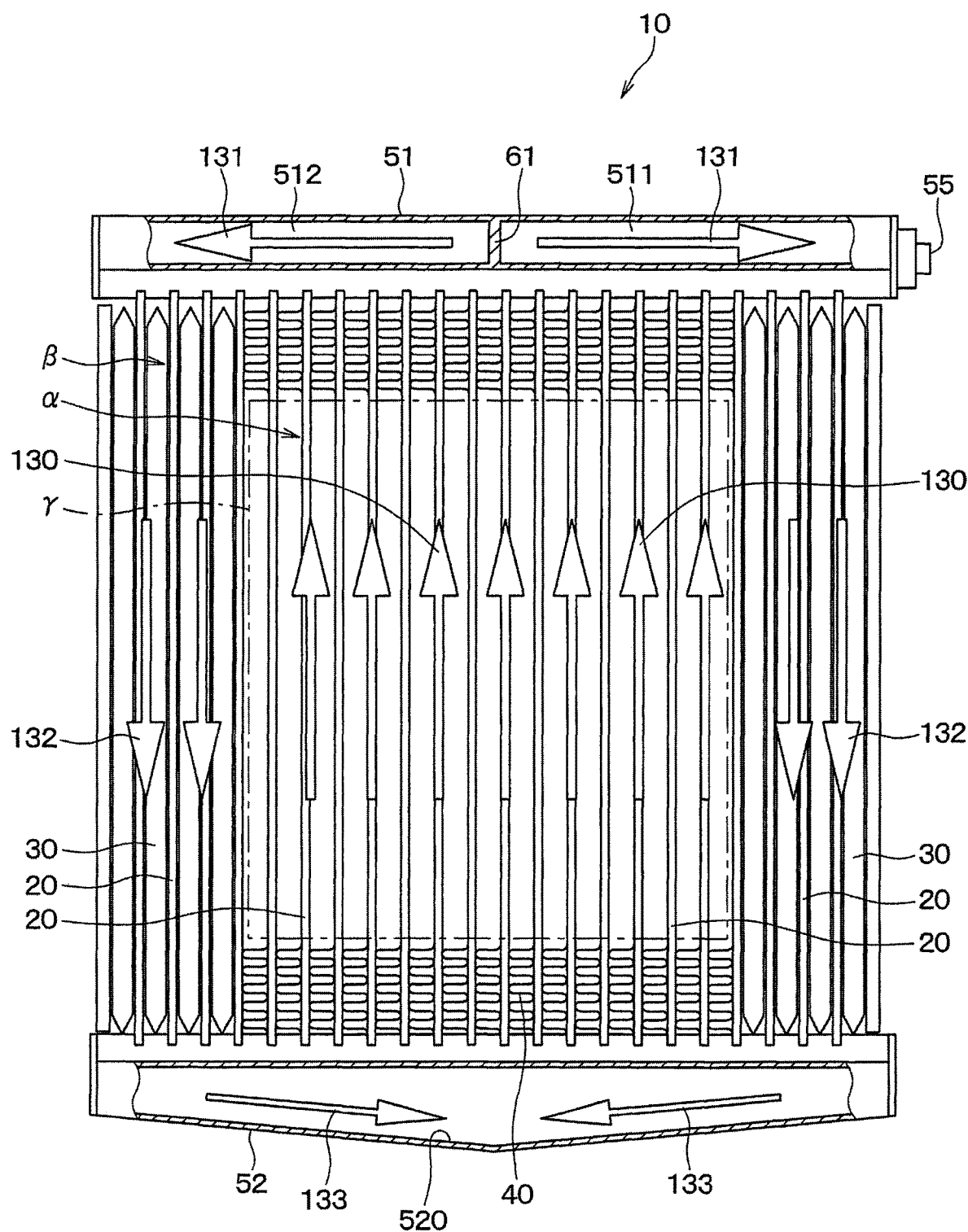
FIG. 14 is a diagram for explaining a flow of a refrigerant in an evaporator during an idle reduction of a vehicle, according to a sixth embodiment.

As shown in FIG. 14, in the evaporator of the sixth embodiment, a bottom 520 of the passage in the second header tank 52 is inclined downward in the direction of gravity from end parts to the center part. Although it is not shown, the bottom of the passage in the fourth header tank 54 is also inclined downward in the direction of gravity from end parts to the center part. In a condition where the evaporator 10 is mounted on the vehicle, the second and fourth header tanks 52, 54 are below the first and third header tanks 51, 53 in a direction of gravity.

The above-described configurations of the second and fourth header tanks 52, 54 intended to improve the flow of the refrigerant during the idle reduction of the vehicle. A flow of the refrigerant in the evaporator 10 during the idle reduction of the vehicle will be described.

When the engine 5 stops due to, for example, the idle reduction control, the flow of the refrigerant in the refrigeration cycle device 1 stops. Accordingly, the temperature of the refrigerant passages 21 in some refrigerant tubes 20 located away from the cold energy container 30 increases, and the liquid-phase refrigerant in the gas-liquid two-phase refrigerant evaporates. The air flowing through the air passage portion is cooled by the latent heat of vaporization of the refrigerant.

In contrast, since some refrigerant tubes 20 close to the cold energy container 30 is cooled by the cold energy of the cold energy storage member 31, the liquid-phase refrigerant in the refrigerant tubes 20 located at that position remains in the liquid-phase condition. Accordingly, the pressure in the refrigerant passage 21 in the first region α is higher than the pressure in the refrigerant passage 21 in the second region β. Accordingly, as indicated by arrows 130, 131, 132 of FIG. 14, the gas-phase refrigerant that has evaporated in the refrigerant passages 21 in the first region α flows through the passages in the first and fourth header tanks 51, 54 into the refrigerant passages 21 in the second region β.

The gas-phase refrigerant flowing into the refrigerant passages 21 in the both end portions of the second region β is cooled and condensed by the cold energy in the cold energy storage member 31 in the cold energy container 30, and then the refrigerant flows into the second and fourth header tanks 52, 54 located on the lower side in the direction of the gravity, as indicated by the arrow 132. In the sixth embodiment, the passages in the second and fourth header tanks 52, 54 are also inclined downward in the direction of gravity from end parts to the center part. Accordingly, as indicated by an arrow 133, the liquid-phase refrigerant flows through the passage in the second and fourth header tanks 52, 54 from the end parts toward the center part. The refrigerant evaporates when the temperature of the refrigerant rises up to the boiling point during flowing from the end parts to the center part of the passage or at the center part. The gas-phase refrigerant that has evaporated flows through the refrigerant passages 21 in the refrigerant tubes 20 in the first region α as indicated by the arrow 130. The air passing through the air passage portion and the low-temperature gas-phase refrigerant exchange heat, and accordingly the air passing through the air passage portion is cooled.

As described above, according to the evaporator 10 of the sixth embodiment, the refrigerant can circulate quickly in the evaporator 10 when the engine 5 of the vehicle stops because the liquid-phase refrigerant in the second and fourth header tanks 52, 54 flows from the end parts toward the center part. Accordingly, the cooling of the passenger compartment can be performed effectively with this evaporator 10.

Seventh Embodiment

A seventh embodiment will be described hereafter.

Figure 15:
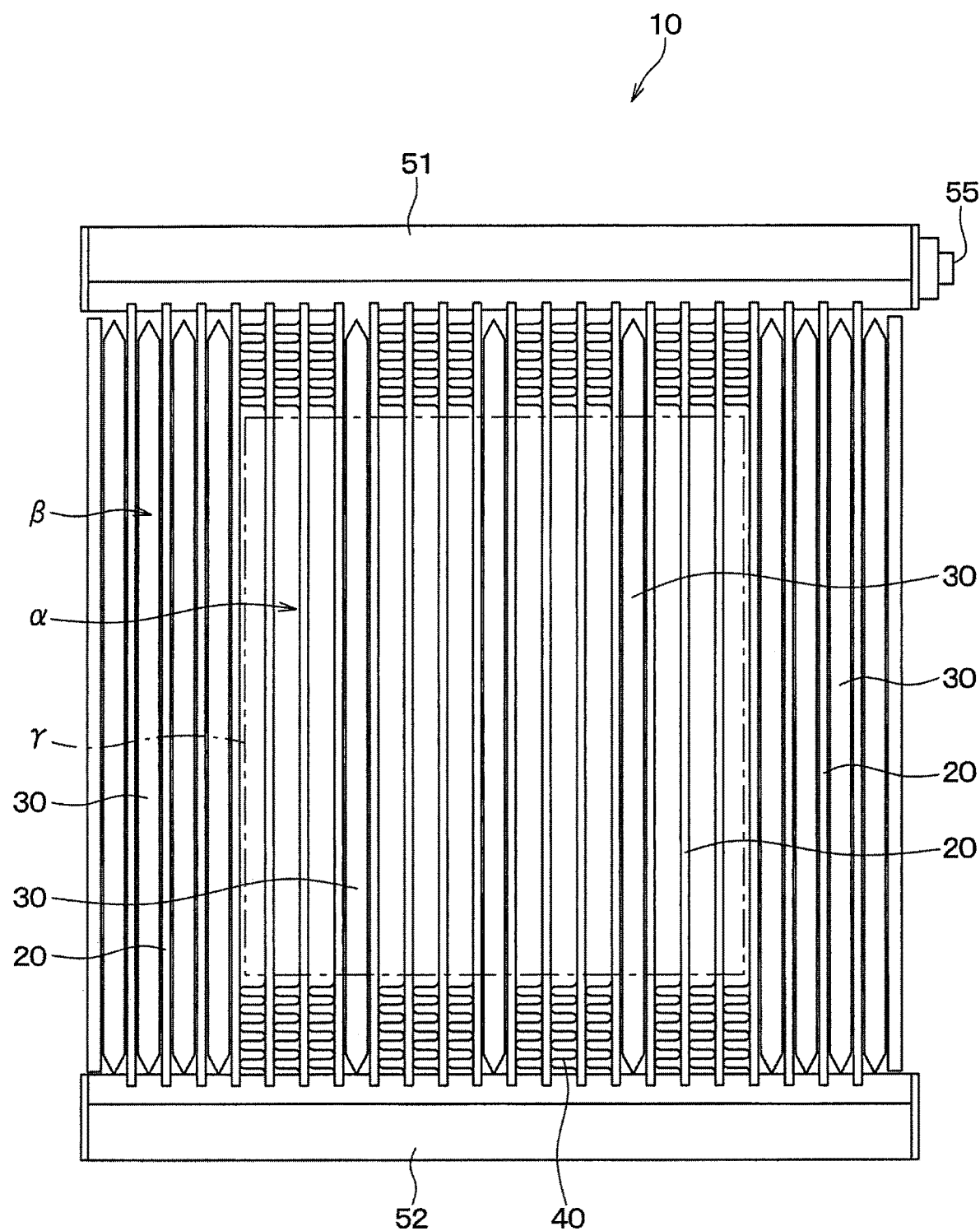
FIG. 15 is a front view illustrating an evaporator according to a seventh embodiment.

As described in FIG. 15, in the evaporator 10 of the seventh embodiment, the cold energy containers 30 are provided in the first region α too. In this configuration, the proportion of the cold energy containers 30 in the second region β is larger than that in the first region α.

The seventh embodiment achieves the same effects as the above-described second to sixth embodiments.

Eighth Embodiment

An eighth embodiment will be described hereafter.

Figure 16:
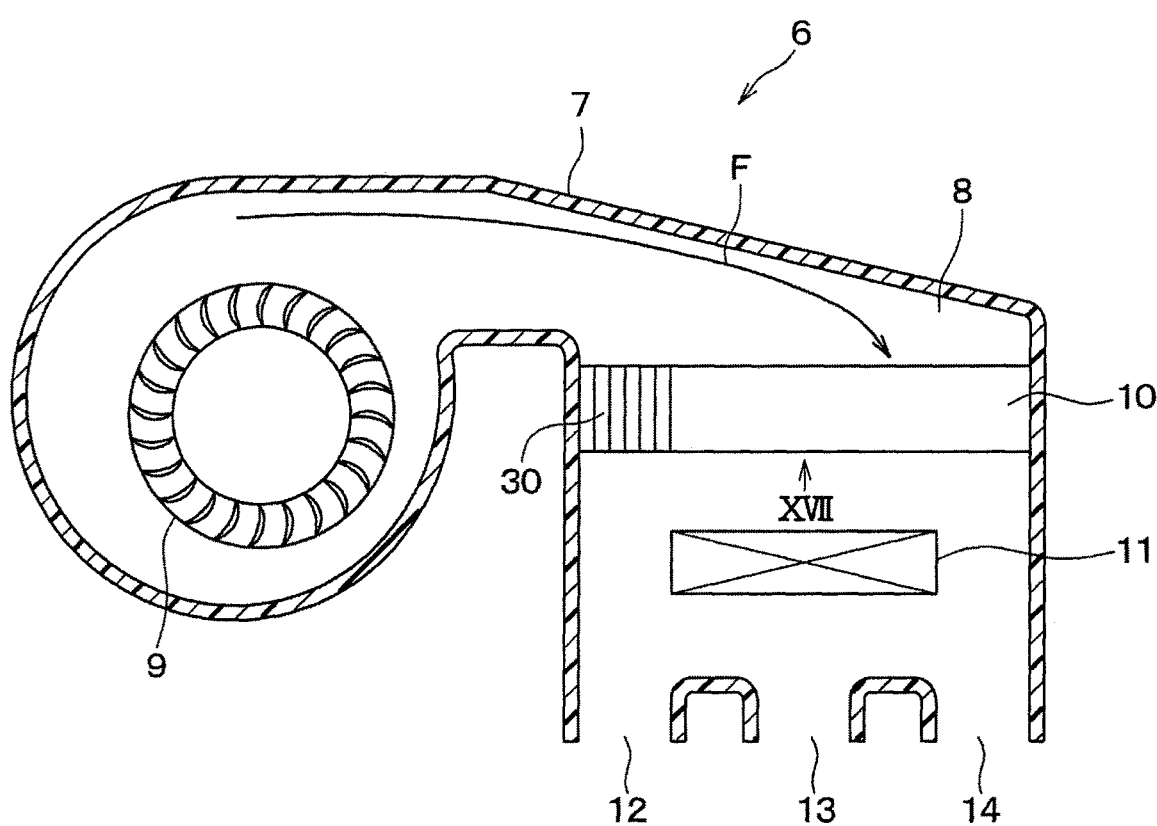
FIG. 16 is a cross-sectional view illustrating an air-conditioning unit for a vehicle according to an eighth embodiment.

As illustrated in FIG. 16, the air passage 8 in which the evaporator 10 of the eighth embodiment is provided extends from the part facing the upstream side of the evaporator 10 toward one side of the evaporator 10 in the crosswise direction. The blower 9 is provided in the air passage 8.

Figure 17:
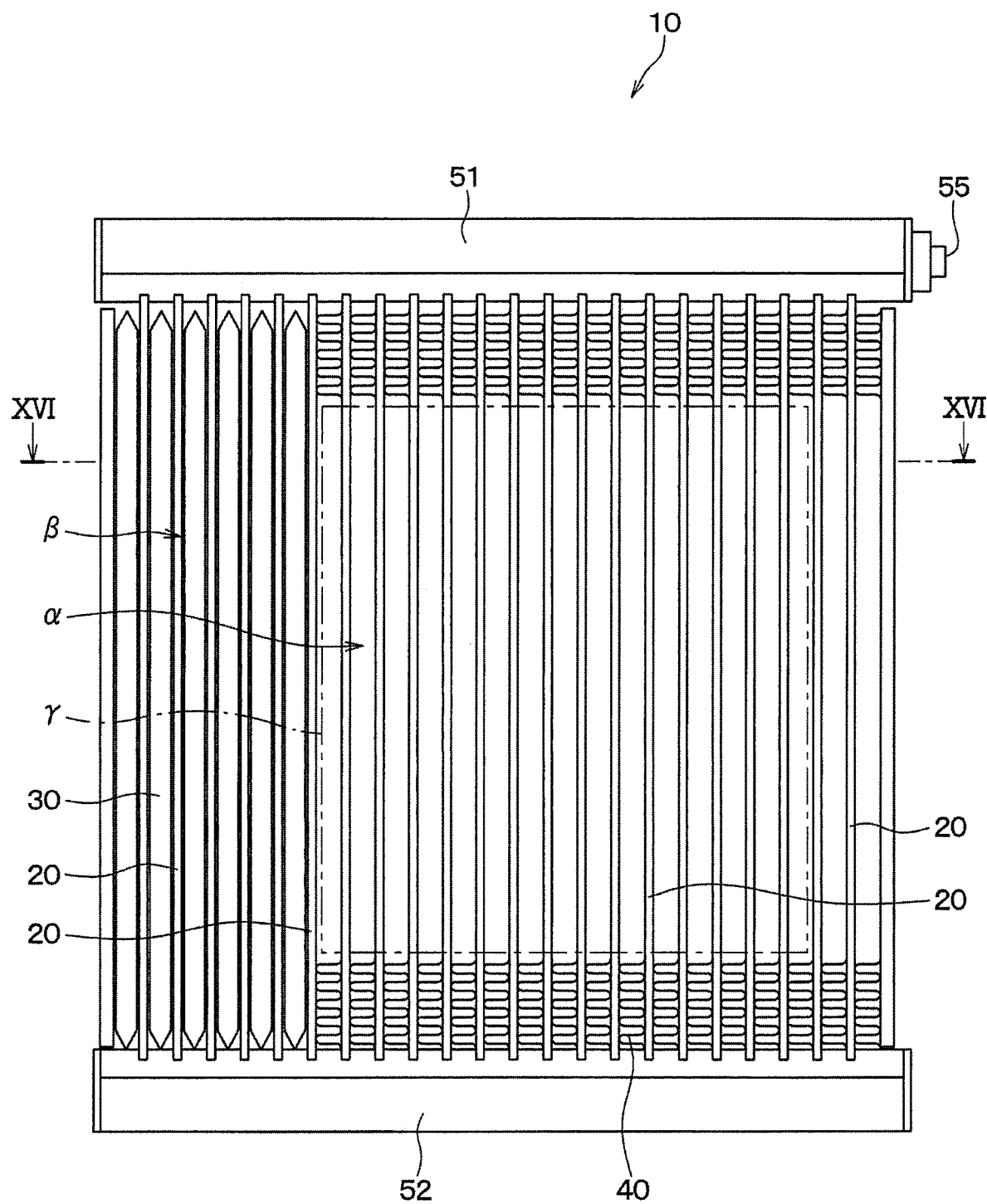
FIG. 17 is a front view illustrating an evaporator according to the eighth embodiment.

As illustrated in FIGS. 16, 17, most of the cold energy containers 30 of the evaporator 10 of the eighth embodiment are provided at a part closer to the blower 9 in the second region β. The cold energy container 30 is not provided in a part farther from the blower 9. In FIG. 16, the part of the evaporator 10 in which the cold energy containers 30 are provided is illustrated. That is, the proportion of the cold energy containers 30 in the side closer to the blower 9 in the second region β is larger than that in the first region α.

In the eighth embodiment, the air blown by the blower 9 to flow through the air passage 8 flows along the inner wall of the air passage 8 as indicated by an arrow F of FIG. 16. In the airflow, the flow speed of the air flowing through the part of the evaporator 10 farther from the blower 9 is high, and the flow speed of the air flowing through the part of the evaporator 10 closer to the blower 9 is low. Accordingly, since the most of the cold energy containers 30 are provided in the part closer to the blower 9 in the second region β of the evaporator 10, the decrease in the flow rate in the air passage 8 due to the cold energy containers 30 can be suppressed. According to the evaporator 10, since the flow rate of the air flowing through the air passage portions increases compared to general evaporators, the cooling capacity during the normal operation of the vehicle can be improved. Further, according to the evaporator 10, since the airflow resistance in the air passage 8 decreases, the power consumption by the blower 9 can be reduced.

According to eighth embodiment, similarly to the first to seventh embodiments, when the engine 5 stops due to, for example, the idle reduction control of the vehicle, the evaporator 10 can cool the air passing through the air passage portions through the refrigerant by using the cold energy in the cold energy storage member 31.

Ninth Embodiment

A ninth embodiment will be described hereafter.

The air passage 8 in which the evaporator 10 of the ninth embodiment is provided has the same shape as the air passage 8 of the eighth embodiment.

Figure 18:
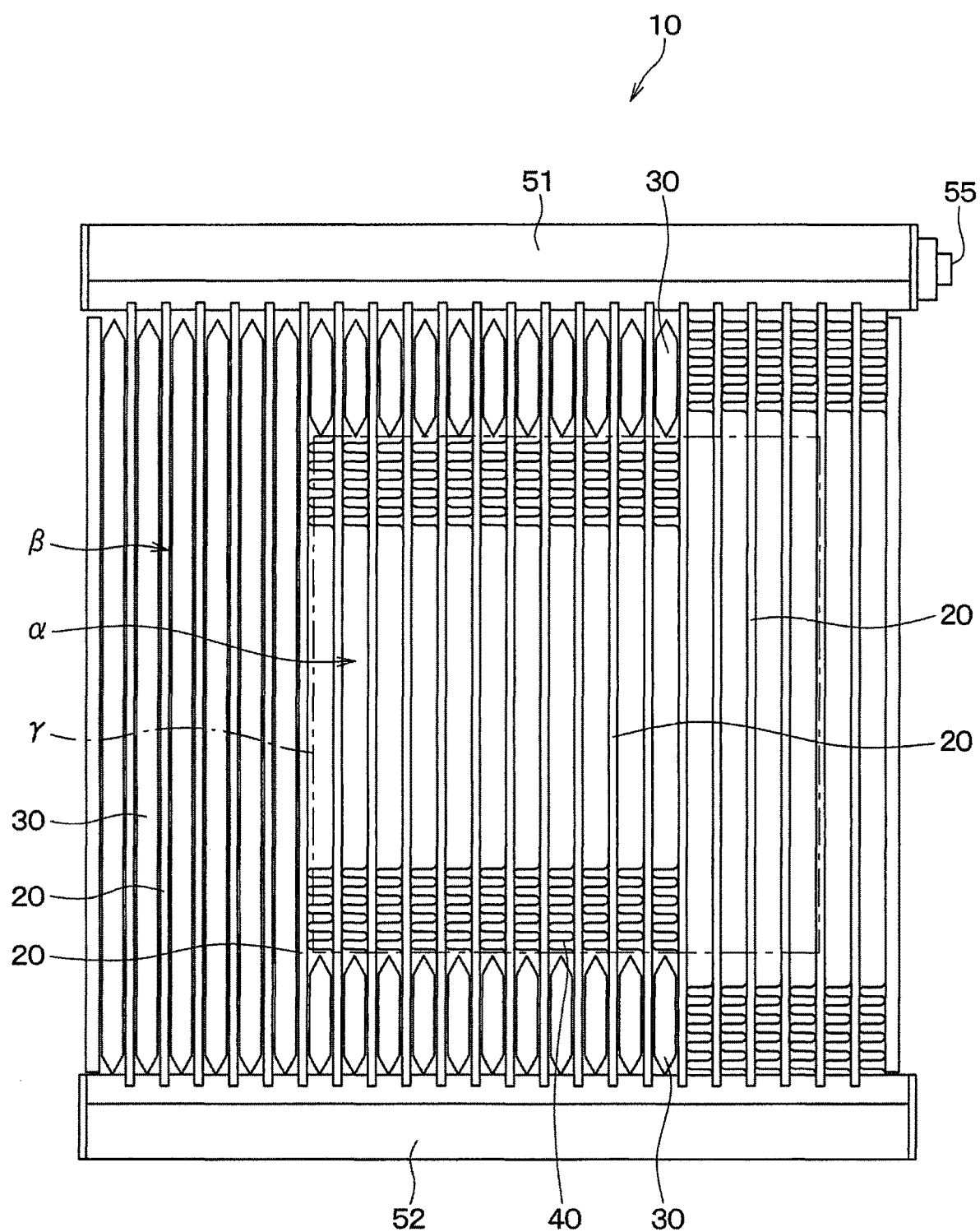
FIG. 18 is a front view illustrating an evaporator according to a ninth embodiment.

As illustrated in FIG. 18, most of the cold energy containers 30 of the evaporator 10 of the ninth embodiment are provided at a part closer to the blower 9 in the second region β, as in the eighth embodiment. The cold energy container 30 is not provided in a part farther from the blower 9.

In the ninth embodiment, the cold energy containers 30 are further provided in both end portions of the second region β in the lengthwise direction. In the large part of the both end portions of the second region β in the lengthwise direction, the flow rate of the air is low regardless of the position of the blower 9. Accordingly, the cold energy container 30 can be provided in the both end portions of the second region β in the lengthwise direction. However, even in the both end portions in the lengthwise direction, the flow speed is large in a part farther from the blower 9. Accordingly, the cold energy container 30 is not provided in a part farther from the blower 9. The ninth embodiment achieves the same effects as the above-described second to eighth embodiments.

Tenth Embodiment

A tenth embodiment will be described hereafter.

Figure 19:
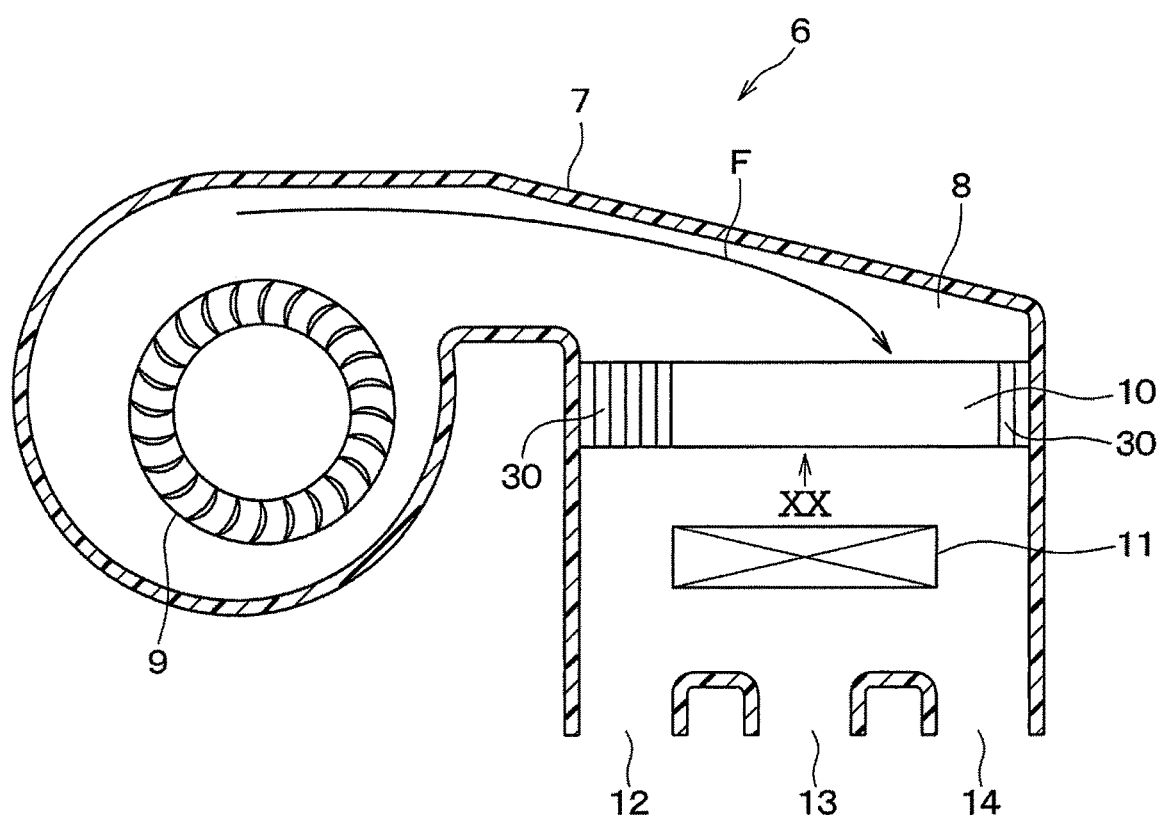
FIG. 19 is a cross-sectional view illustrating an air-conditioning unit for a vehicle according to a tenth embodiment.

As illustrated in FIG. 19, the air passage 8 in which the evaporator 10 of the tenth embodiment is provided has the same shape as the air passage 8 of the eighth and ninth embodiments.

In FIG. 19, the part of the evaporator 10 in which the cold energy containers 30 are provided is illustrated.

Figure 20:
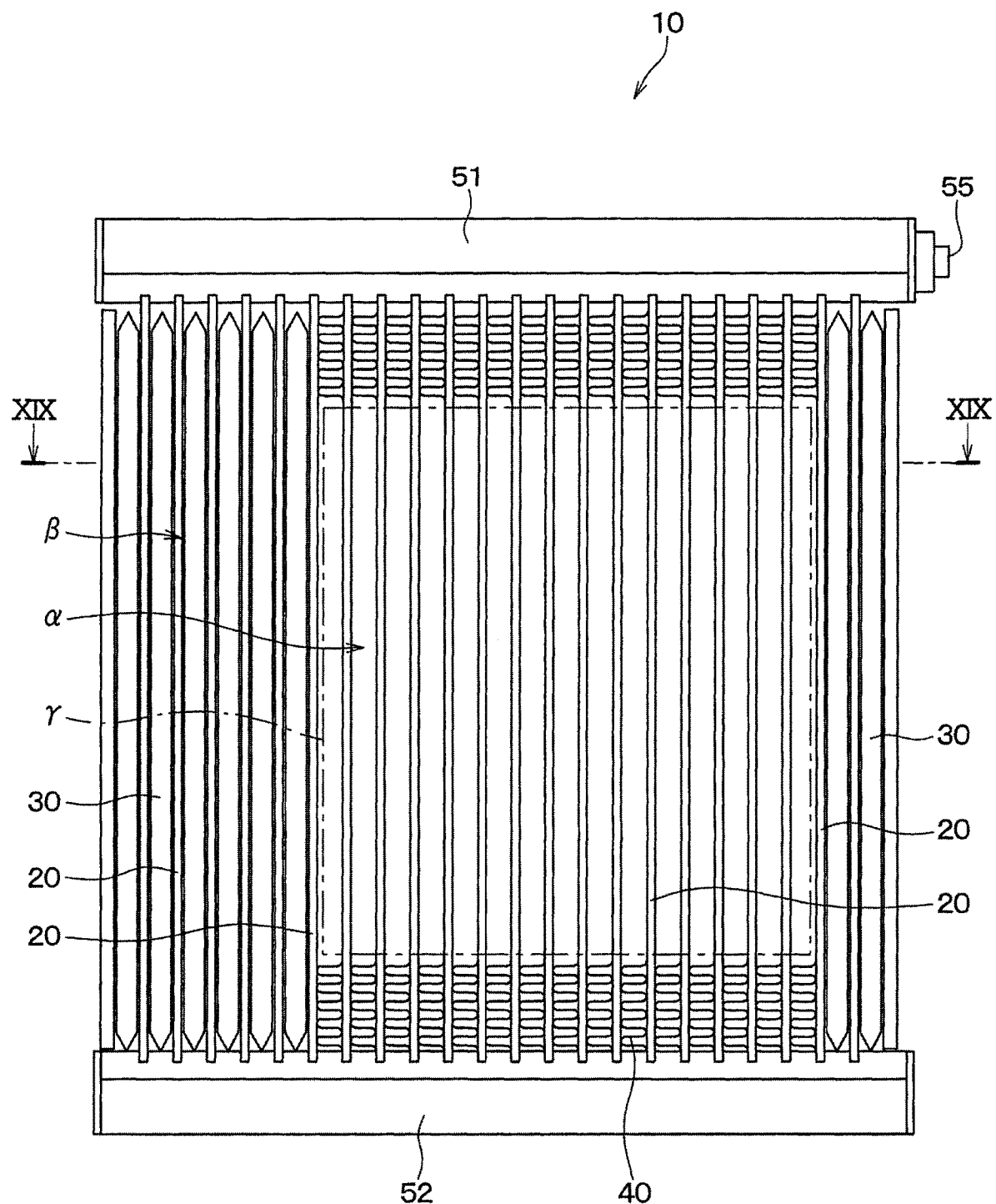
FIG. 20 is a front view illustrating an evaporator according to the tenth embodiment.

As illustrated in FIG. 20, most of the cold energy containers 30 of the evaporator 10 of the tenth embodiment are provided at a part closer to the blower 9 in the second region β. Further, in the tenth embodiment, the cold energy containers 30 are provided in a part close to the inner wall of the air passage 8 even in the part of the second region β farther from the blower 9.

In the tenth embodiment, the air blown by the blower 9 to flow through the air passage 8 flows along the inner wall of the air passage 8 as indicated by an arrow F in FIG. 19. In the airflow, the flow speed of the air flowing through the part of the evaporator 10 farther from the blower 9 is high, and the flow speed of the air flowing through the part of the evaporator 10 closer to the blower 9 is low. The air is unlikely to flow in the part close to the inner wall of the air passage 8 even in the part of the evaporator 10 farther from the blower 9. Accordingly, the cold energy containers 30 can be provided in the part of the evaporator 10 close to the inner wall of the air passage 8 even in the part farther from the blower 9. The tenth embodiment achieves the same effects as the above-described second to ninth embodiments.

Eleventh Embodiment

An eleventh embodiment will be described hereafter.

The air passage 8 in which the evaporator 10 of the eleventh embodiment is provided has the same shape as the air passage 8 of the eighth to tenth embodiments.

Figure 21:
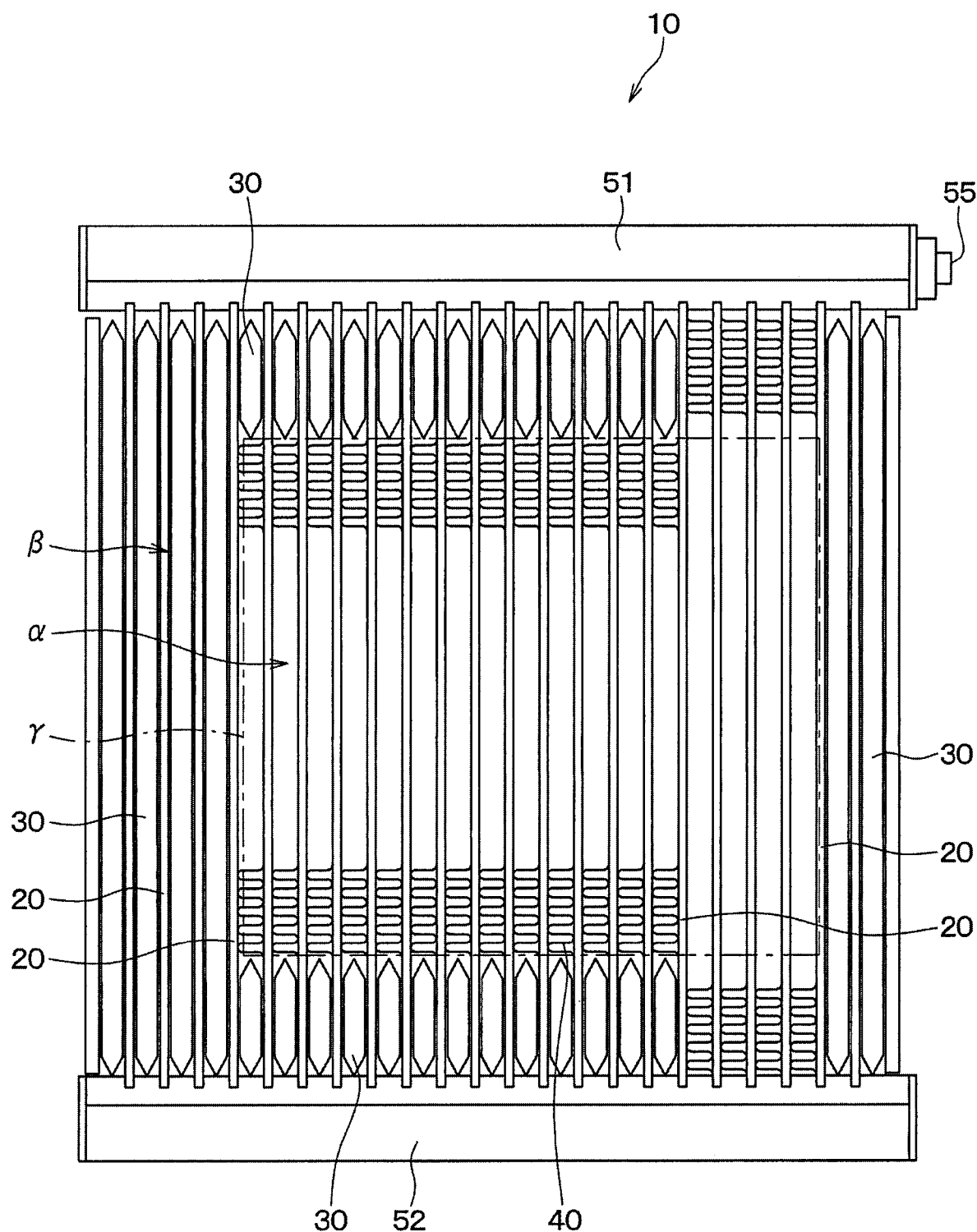
FIG. 21 is a front view illustrating an evaporator according to an eleventh embodiment.

As illustrated in FIG. 21, most of the cold energy containers 30 of the evaporator 10 of the eleventh embodiment are provided at a part closer to the blower 9 in the second region β, as in the tenth embodiment. Further, the cold energy containers 30 are provided in a part close to the inner wall of the air passage 8 even in the part farther from the blower 9 in the second region β.

In the eleventh embodiment, the cold energy containers 30 are further provided in both end portions of the second region β in the lengthwise direction. In the large part of the both end portions in the lengthwise direction in the second region β, the flow rate of the air is low regardless of the position of the blower 9. Accordingly, the cold energy container 30 can be provided in the both end portions in the lengthwise direction in the second region β of the evaporator 10. However, even in the both end portions in the lengthwise direction, the flow speed is large in a part farther from the blower 9. Accordingly, the cold energy container 30 located in the both end portions in the lengthwise direction is not provided in a part farther from the blower 9. The eleventh embodiment achieves the same effects as the above-described second to tenth embodiments.

Twelfth Embodiment

A twelfth embodiment will be described hereafter.

Figure 22:
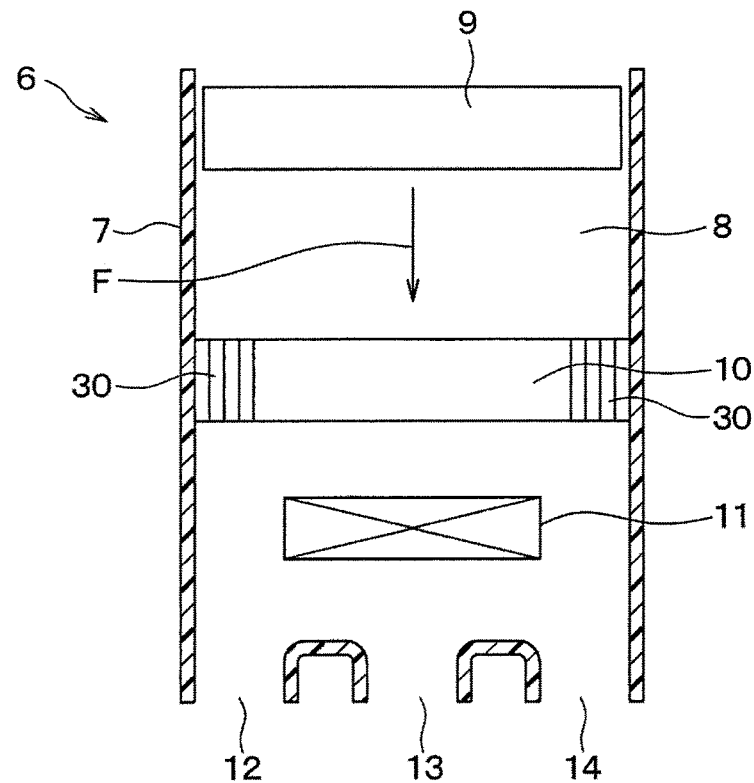
FIG. 22 is a cross-sectional view illustrating an air-conditioning unit for a vehicle according to a twelfth embodiment.

As illustrated in FIG. 22, the air passage 8 of the twelfth embodiment in which the evaporator 10 is provided extends both on the front side and the back side of the evaporator 10. The blower 9 is located on the front side, i.e. upstream side, of the evaporator 10 in the air passage 8. That is, the blower 9 and the evaporator 10 face each other.

In FIG. 22, the part of the evaporator 10 in which the cold energy containers 30 are provided is illustrated. The cold energy containers 30 of the evaporator 10 of the twelfth embodiment are provided in the both end portions of the second region β in the crosswise direction, as in the first embodiment described with reference to FIG. 3. The end portions of the second region β in the crosswise direction are close to an inner wall of the air passage 8 when the evaporator 10 is installed in the air passage 8 of the vehicular air-conditioning unit 6. In the twelfth embodiment, it is preferable that the number of the cold energy container 30 provided in one end portion of the second region β in the crosswise direction is the same as the number of the cold energy container 30 provided in the other end portion in the crosswise direction.

The twelfth embodiment achieves the same effects as the above-described second to eleventh embodiments.

Thirteenth Embodiment

A thirteenth embodiment will be described hereafter.

Figure 23:
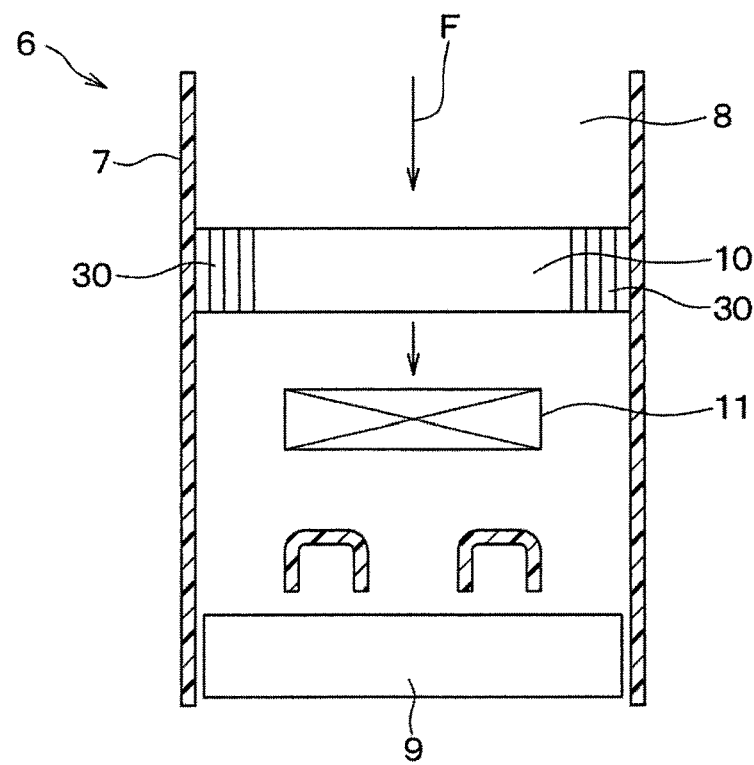
FIG. 23 is a cross-sectional view illustrating an air-conditioning unit for a vehicle according to a thirteenth embodiment.

As illustrated in FIG. 23, the air passage 8 of the thirteenth embodiment in which the evaporator 10 is provided extends both on the front side and the back side of the evaporator 10. The blower 9 is located on the back side, i.e. downstream side, of the evaporator 10 in the air passage 8. That is, the blower 9 and the evaporator 10 face each other.

In FIG. 23, the part of the evaporator 10 in which the cold energy containers 30 are provided is illustrated. The cold energy containers 30 in the evaporator 10 of the thirteenth embodiment are the same as the twelfth embodiment. The thirteenth embodiment achieves the same effects as the above-described second to twelfth embodiments.

Other Embodiments

The present disclosure is not limited to the embodiments described above, and can be changed as appropriate. Individual elements or features of a particular embodiment are generally not limited to that particular embodiment, but, where applicable, are interchangeable and can be used in a selected embodiment, even if not specifically shown or described. Individual elements or features of a particular embodiment are not necessarily essential unless it is specifically stated that the elements or the features are essential in the foregoing description, or unless the elements or the features are obviously essential in principle. A quantity, a value, an amount, a range, or the like, if specified in the above-described example embodiments, is not necessarily limited to the specific value, amount, range, or the like unless it is specifically stated that the value, amount, range, or the like is necessarily the specific value, amount, range, or the like, or unless the value, amount, range, or the like is obviously necessary to be the specific value, amount, range, or the like in principle. The shape, the positional relationship, and the like of a component or the like mentioned in the above embodiments are not limited to those being mentioned unless otherwise specified, limited to specific shape, positional relationship, and the like in principle, or the like.

For example, although the cold energy containers 30 of the first embodiment are provided in the both end portions of the second region β in the crosswise direction, the cold energy containers 30 may be provided in one end portion of the second region β in the crosswise direction.

Further, although the cold energy containers 30 of the third embodiment are provided in the both end portions of the second region β in the lengthwise direction, the cold energy containers 30 may be provided in one end portion of the second region β in the lengthwise direction.

Further, although the cold energy containers 30 of the fourth embodiment are provided in all of the four corner portions of the second region β in the lengthwise direction, the cold energy containers 30 may be provided in at least one corner portion in the four corner portions.

According to the above-described embodiments, the blower 9 is located upstream of the evaporator 10 in the vehicular air-conditioning unit 6. The blower 9 may be located downstream of the evaporator 10.

In the above-described embodiments, the air passage located upstream of the evaporator 10 in the vehicular air-conditioning unit 6 has a curved shape with respect to the front side of the evaporator 10. However, the air passage located upstream of the evaporator 10 may extend straight with respect to the front side of the evaporator 10 or other variable shapes.

(Conclusion)

According to a first aspect described in some or all of the above-described embodiment, the cold-storage heat exchanger is to be provided in the air passage of the vehicular air-conditioning unit and includes the first header tank, the second header tank, the refrigerant tubes, and the cold energy containers. The first header tank defines the passage through which the refrigerant flows. The second header tank defines the passage through which the refrigerant flows, and the second header tank is located away from the first header tank. The refrigerant tubes define the refrigerant passages through which the passage in the first header tank and the passage in the second header tank communicate with each other, and the refrigerant tubes are spaced away from each other. The cold energy containers store cold energy storage members that freeze due to heat exchange with the refrigerant flowing through the refrigerant passages of the refrigerant tubes, and the cold energy containers are provided to close some of the air passage portions defined between the refrigerant tubes. The region including the air passage portions are separated into the first region including the center part of the region and the second region that is remaining part of the region. The proportion of the cold energy containers in the second region is larger than that in the first region.

According to a second aspect, the second region includes two different end portions in the direction intersecting the direction in which the first header tank and the second header tank face each other, and the proportion of the cold energy containers in at least one of the end portions of the second region is larger than that in the first region.

According to this, most of the cold energy containers are provided in the position close to the inner wall where the air flow speed is relatively low in the air passage of the vehicular air-conditioning unit, and the number of the cold energy container provided in the center of the air passage where the air flow speed is high is small. Accordingly, an increase in airflow resistance in the center part of the air passage due to the cold energy containers can be avoided. Accordingly, the cooling capacity during the normal operation of the vehicle can be improved.

Further, the position of the cold energy container of the embodiments of the present disclosure can be modified without a change in shape of the cold energy container of general cold-storage heat exchanger.

According to a third aspect, the vehicular air-conditioning unit includes the air passage that extends from the position facing the upstream surface of the cold-storage heat exchanger toward one side in the direction intersecting the direction in which the end portions in a direction intersecting a direction in which the first header tank and the second header tank face each other, and the blower provided in the air passage.

The proportion of the cold energy containers in the side closer to the blower in the second region is larger than that in the first region.

According to a fourth aspect, the second region includes two different end portions in the direction intersecting the direction in which the first header tank and the second header tank face each other, and the proportion of the cold energy containers in both of the end portions of the second region is larger than that in the first region.

According to this, most of the cold energy containers are provided in the position close to the inner wall where the air flow speed is relatively low in the air passage of the vehicular air-conditioning unit, and the number of the cold energy container provided in the center of the air passage where the air flow speed is high is small. Accordingly, an increase in airflow resistance in the center part of the air passage due to the cold energy containers can be avoided. Accordingly, the cooling capacity during the normal operation of the vehicle can be improved.

According to a fifth aspect, the vehicular air-conditioning unit includes the air passage extending in a direction in which a front surface of the cold-storage heat exchanger faces and in a direction in which a back surface of the cold-storage heat exchanger faces, and the blower provided in the air passage to face the cold-storage heat exchanger. The second region includes two different end portions in the direction intersecting the direction in which the first header tank and the second header tank face each other, and the proportion of the cold energy containers in both of the end portions of the second region is larger than that in the first region.

According to a sixth aspect, the second region includes two different end portions in the direction in which the first header tank and the second header tank face each other, and the proportion of the cold energy containers in at least one of the end portions of the second region is larger than that in the first region.

According to this, most of the cold energy containers are provided in the position close to the inner wall where the air flow speed is relatively low in the air passage of the vehicular air-conditioning unit, and the number of the cold energy container provided in the center of the air passage where the air flow speed is high is small. Accordingly, an increase in airflow resistance in the center part of the air passage due to the cold energy containers can be avoided. Accordingly, the cooling capacity during the normal operation of the vehicle can be improved.

According to a seventh aspect, the first region has a rectangular shape, and the second region has a shape surrounding the first region to have four corner portions. The proportion of the cold energy containers in the four corner portions of the second region is larger than that in the first region.

According to this, most of the cold energy containers are provided in the position close to the inner wall where the air flow speed is relatively low in the air passage of the vehicular air-conditioning unit, and the number of the cold energy container provided in the center of the air passage where the air flow speed is high is small. Accordingly, an increase in airflow resistance in the center part of the air passage due to the cold energy containers can be avoided. Accordingly, the cooling capacity during the normal operation of the vehicle can be improved.

According to an eighth aspect, in a condition where the cold-storage heat exchanger is mounted on the vehicle, the first header tank is above the second header tank in the direction of gravity. The part of the passage in the first header tank located above the first region communicates with another part located above the second region.

According to this, when the engine stops due to, for example, the idle reduction control of the vehicle, the refrigerant evaporated in the refrigerant passage in the first region can move from the part above the first region to the part above the second region in the first header tank. Accordingly, the refrigerant can circulate in the cold-storage heat exchanger in the condition where the engine of the vehicle stops.

According to a ninth aspect, in the condition where the cold-storage heat exchanger is mounted on the vehicle, the first header tank is above the second header tank in the direction of gravity. The cold-storage heat exchanger includes the partition panel that limits the flow of the refrigerant in the passage of the first header tank. The partition panel includes through-hole extending in the thickness direction.

According to this, the refrigerant can flow from a part located above the first region to a part located above the second region in the passage in the first header tank. Accordingly, the refrigerant can circulate in the cold-storage heat exchanger in the condition where the engine of the vehicle stops.

According to a tenth aspect, the cold-storage heat exchanger is to be provided in the air passage of the vehicular air-conditioning unit. In the condition where the cold-storage heat exchanger is installed in the vehicular air-conditioning unit, the part of the second region in which the proportion of the cold energy containers is close to the inner wall.

According to this, since most of the cold energy containers are provided in the position close to the inner wall of the air passage of the vehicular air-conditioning unit where the airflow resistance is small, and the number of the cold energy container provided in the center part of the air passage is small, the increase in airflow resistance in the center part of the air passage due to the cold energy container can be limited. Accordingly, the cooling capacity during the normal operation of the vehicle can be improved.

According to an eleventh aspect, the cold-storage heat exchanger is provided in the air passage of the vehicular air-conditioning unit and extends to an outside of the air passage. In the condition where the cold-storage heat exchanger is installed in the vehicular air-conditioning unit, the part of the second region in which the proportion of the cold energy container is large is located outside the air passage, and the first region is located inside the air passage.

According to this, since most of the cold energy containers are provided outside the air passage of the vehicular air-conditioning unit, the increase in airflow resistance in the center part of the air passage due to the cold energy container can be limited. Accordingly, the cooling capacity during the normal operation of the vehicle can be improved.

According to a twelfth aspect, in the condition where the cold-storage heat exchanger is mounted on the vehicle, the second header tank is below the first header tank in the direction of gravity. The bottom of the passage in the second header tank is inclined downward in the direction of gravity from end parts to the center part.

According to this, when the engine stops due to, for example, the idle reduction control of the vehicle, the liquid-phase refrigerant condensed in the refrigerant passage in the second region drops into the passage in the second header tank and flows through the passage from the end parts to the center part. The liquid-phase refrigerant evaporates at the center part of the passage and circulates in the refrigerant passage. According to this cold-storage heat exchanger, the refrigerant can be circulated when the engine of the vehicle stops, and the air passing through the air passage portion can be cooled.

What is claimed is:

1. A cold-storage heat exchanger provided in an air passage of a vehicular air-conditioning unit, the cold-storage heat exchanger comprising:
    a first header tank defining a passage through which a refrigerant flows;
    a second header tank defining a passage through which the refrigerant flows and located away from the first header tank;
    a plurality of refrigerant tubes defining refrigerant passages through which the passage in the first header tank and the passage in the second header tank communicate with each other, the plurality of refrigerant tubes being aligned and spaced away from each other;
    a plurality of cold energy containers storing cold energy storage members that freeze due to heat exchange with the refrigerant flowing through the refrigerant passages, the plurality of cold energy containers being provided to close a part of a plurality of air passage portions defined between the plurality of refrigerant tubes; and
    a front side facing in a direction intersecting both a direction in which the first header tank and the second header tank face each other and a direction in which the plurality of refrigerant tubes are aligned, wherein
    the front side includes
        a first region including a center part of the front side and having a rectangular shape, and
        a second region that is a remaining part of the front side, the second region having a same area as the first region, and
    a proportion of the plurality of cold energy containers in the second region is larger than that in the first region.

2. The cold-storage heat exchanger according to claim 1, wherein
    the second region includes two different end portions in a direction intersecting a direction in which the first header tank and the second header tank face each other, and
    the proportion of the plurality of cold energy containers in at least one of the end portions of the second region is larger than that in the first region.

3. The cold-storage heat exchanger according to claim 1, wherein
    the vehicular air-conditioning unit includes
        the air passage that extends from a position facing an upstream surface of the cold-storage heat exchanger toward one side in a direction intersecting a direction in which the first header tank and the second header tank face each other, and
        a blower provided in the air passage, and
    the proportion of the plurality of cold energy containers in an end portion of the second region close to the blower is larger than that in the first region.

4. The cold-storage heat exchanger according to claim 1, wherein
    the second region includes two different end portions in a direction intersecting a direction in which the first header tank and the second header tank face each other, and
    the proportion of the plurality of cold energy containers in both of the end portions of the second region is larger than that in the first region.

5. The cold-storage heat exchanger according to claim 1, wherein
    the vehicular air-conditioning unit includes
        the air passage extending in a direction in which a front surface of the cold-storage heat exchanger faces and in a direction in which a back surface of the cold-storage heat exchanger faces, and
        a blower provided in the air passage to face the cold-storage heat exchanger,
    the second region includes two different end portions in a direction intersecting a direction in which the first header tank and the second header tank face each other, and
    the proportion of the plurality of cold energy containers in both of the end portions of the second region is larger than that in the first region.

6. The cold-storage heat exchanger according to claim 1, wherein
    the second region includes two different end parts in a direction in which the first header tank and the second header tank face each other, and
    the proportion of the plurality of cold energy containers in at least one of the end parts of the second region is larger than that in the first region.

7. The cold-storage heat exchanger according to claim 1, wherein
    the second region has a shape surrounding the first region to have four corner portions, and
    the proportion of the plurality of cold energy containers in the four corner portions of the second region is larger than that in the first region.

8. The cold-storage heat exchanger according to claim 1, wherein
the first header tank is located above the second header tank in a direction of gravity in a condition where the cold-storage heat exchanger is mounted on the vehicle, and
a part of the passage of the first header tank located above the first region communicates with another part of the passage of the first header tank located above the second region.

9. The cold-storage heat exchanger according to claim 1, further comprising:
a partition panel that limits a flow of the refrigerant in the passage of the first header tank, wherein
the first header tank is located above the second header tank in a direction of gravity in a condition where the cold-storage heat exchanger is mounted on the vehicle, and
the partition panel includes a through-hole extending through the partition panel in a direction of thickness of the partition panel.

10. The cold-storage heat exchanger according to claim 1, wherein
the cold-storage heat exchanger is provided in the air passage of the vehicular air-conditioning unit, in a condition where the cold-storage heat exchanger is installed in the vehicular air-conditioning unit, a part of the second region in which the proportion of the plurality of cold energy containers is large is closer to an inner wall of the air passage than the first region.

11. The cold-storage heat exchanger according to claim 1, wherein
the cold-storage heat exchanger provided in the air passage of the vehicular air-conditioning unit extends to an outside of the air passage,
in a condition where the cold-storage heat exchanger is installed in the vehicular air-conditioning unit, a part of the second region in which the proportion of the plurality of cold energy containers is large is located outside the air passage, and the first region is located inside the air passage.

12. The cold-storage heat exchanger according to claim 1, wherein
the second header tank is located below the first header tank in a direction of gravity in a condition where the cold-storage heat exchanger is mounted on the vehicle, and
a bottom of the passage of the second header tank is inclined downward from ends of the passage to a center of the passage.

* * * * *